US012581240B2

(12) United States Patent
Peng

(10) Patent No.: US 12,581,240 B2
(45) Date of Patent: Mar. 17, 2026

(54) METHOD AND SYSTEM FOR DETERMINING AUDIO CHANNEL ROLE OF SOUND BOX, ELECTRONIC DEVICE, AND STORAGE MEDIUM

(71) Applicant: Huawei Technologies Co., Ltd., Shenzhen (CN)

(72) Inventor: Zhengyuan Peng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 209 days.

(21) Appl. No.: 18/245,792

(22) PCT Filed: Aug. 23, 2021

(86) PCT No.: PCT/CN2021/114028
§ 371 (c)(1),
(2) Date: Mar. 17, 2023

(87) PCT Pub. No.: WO2022/057572
PCT Pub. Date: Mar. 24, 2022

(65) Prior Publication Data

US 2024/0031739 A1 Jan. 25, 2024

(30) Foreign Application Priority Data

Sep. 18, 2020 (CN) ......................... 202010986470.5

(51) Int. Cl.
*H04R 5/04* (2006.01)
*H04R 5/02* (2006.01)
*H04S 3/00* (2006.01)

(52) U.S. Cl.
CPC ................. *H04R 5/04* (2013.01); *H04R 5/02* (2013.01); *H04S 3/008* (2013.01); *H04S 2400/01* (2013.01)

(58) Field of Classification Search
None
See application file for complete search history.

(56) References Cited

U.S. PATENT DOCUMENTS

2005/0152557 A1* 7/2005 Sasaki ..................... H04S 7/302 381/59
2013/0156198 A1* 6/2013 Kim ........................ G01S 3/808 381/17

(Continued)

FOREIGN PATENT DOCUMENTS

CN 103181235 A 6/2013
CN 104185132 A 12/2014

(Continued)

OTHER PUBLICATIONS

WO2019208012 Signal Processing Device, Channel Setting Mehtod, Program and Speaker System, 44 Pages, Tamaki, Tatsuay, Oct. 31, 2019 Translation (Year: 2019).*

*Primary Examiner* — Duc Nguyen
*Assistant Examiner* — Assad Mohammed
(74) *Attorney, Agent, or Firm* — Slater Matsil, LLP

(57) ABSTRACT

A method and system for determining an audio channel role of a sound box. The method includes: obtaining first distance information between a first sound box and M second sound boxes; obtaining second distance information between one second sound box and at least two other second sound boxes in the M second sound boxes; and determining audio channel role information of the first sound box and the M second sound boxes based on the first distance information, the second distance information, and first indication information. The first indication information is used to indicate relative locations of the first sound box and any of the M second sound boxes, and M is an integer greater than 1.

19 Claims, 13 Drawing Sheets

(56) References Cited

U.S. PATENT DOCUMENTS

| | | | | |
|---|---|---|---|---|
| 2015/0334504 | A1 | 11/2015 | Donaldson | |
| 2016/0286330 | A1* | 9/2016 | Kofman | H04S 7/303 |
| 2017/0208414 | A1 | 7/2017 | Lee et al. | |
| 2017/0245091 | A1* | 8/2017 | Van Laack | H04R 5/02 |
| 2018/0376268 | A1 | 12/2018 | Kerdranvat et al. | |

FOREIGN PATENT DOCUMENTS

| | | | | |
|---|---|---|---|---|
| CN | 104981713 | A | 10/2015 | |
| CN | 106162444 | A | 11/2016 | |
| CN | 106688253 | A | 5/2017 | |
| CN | 107211226 | A | 9/2017 | |
| CN | 108370471 | A | 8/2018 | |
| CN | 108882139 | A | 11/2018 | |
| CN | 109074238 | A | 12/2018 | |
| CN | 110809247 | A | 2/2020 | |
| CN | 111031419 | A | 4/2020 | |
| CN | 111565355 | A | 8/2020 | |
| IN | 104967953 | A | 10/2015 | |
| JP | 2011004077 | A | 1/2011 | |
| JP | 2014003381 | A | 1/2014 | |
| JP | WO-2019208012 | A1 * | 10/2019 | H04R 3/12 |
| WO | 2019208012 | A1 | 10/2019 | |

* cited by examiner

METHOD AND SYSTEM FOR DETERMINING AUDIO CHANNEL ROLE OF SOUND BOX, ELECTRONIC DEVICE, AND STORAGE MEDIUM

CROSS-REFERENCE TO RELATED APPLICATIONS

This application is a national stage of International Application No. PCT/CN2021/114028, filed on Aug. 23, 2021, which claims priority to Chinese Patent Application No. 202010986470.5, filed on Sep. 18, 2020. Both of the aforementioned applications are incorporated herein by reference in their entireties.

TECHNICAL FIELD

This application relates to the field of sound box systems, and more specifically, to a method and system for determining an audio channel role of a sound box, an electronic device, and a computer-readable storage medium in the communication field.

BACKGROUND

With development and rise of a mobile Internet and smart mobile terminals, smart home devices become an important field for development of artificial intelligence (artificial intelligence, AI) technologies in the future. A stereo sound box system (for example, a 5-channel sound box system or a 7-channel sound box system) including a plurality of sound boxes is more widely applied. The plurality of sound boxes in the stereo sound box system need to be placed in different locations to achieve a surround sound effect.

The 5-channel sound box system is used as an example. Audio channel role information of all sound boxes in the 5-channel sound box system is usually a central audio channel, a front left audio channel, a front right audio channel, a rear left audio channel, and a rear right audio channel. Correspondingly, all the sound boxes having different audio channel role information separately play audio signals of different audio channels. Currently, audio channel role information of each sound box in the stereo sound box system needs to be preconfigured before delivery, and the audio channel role information needs to be marked on each sound box. During indoor arrangement of the sound boxes and multi-channel configuration, a configuration person needs to place all the sound boxes at corresponding locations based on the preconfigured audio channel role information. For example, a sound box marked with the central audio channel is placed directly in front of a reference location point, a sound box marked with the front left audio channel is placed at a left front location, a sound box marked with the front right audio channel is placed at a right front location, a sound box marked with the rear left audio channel is placed at a left rear location, and a sound box marked with the rear right audio channel is placed at a right rear location.

In the foregoing multi-channel configuration manner, all the sound boxes need to be placed at the corresponding locations strictly based on the preconfigured audio channel role information. However, because a capacity and experience of the configuration person are limited, a process of configuring audio channels of the sound boxes is often tedious and complex. Therefore, based on a user requirement of forming the stereo sound box system by the plurality of sound boxes, a current process of configuring audio channel roles of the sound boxes needs to be improved.

SUMMARY

This application provides a method, apparatus, and system for determining an audio channel role of a sound box, an electronic device, and a computer-readable storage medium, to more conveniently configure audio channel roles for a plurality of sound boxes.

According to a first aspect, this application provides a method for determining an audio channel role of a sound box. The method includes:

- obtaining first distance information between a first sound box and M second sound boxes;
- obtaining second distance information between one second sound box and at least two other second sound boxes in the M second sound boxes; and
- determining audio channel role information of the first sound box and the M second sound boxes based on the first distance information, the second distance information, and first indication information.

The first indication information is used to indicate relative locations of the first sound box and any of the M second sound boxes, and M is an integer greater than 1.

In the foregoing solution, a plurality of independent sound boxes (including the first sound box and the M second sound boxes) whose audio channel roles are not preconfigured can be freely placed based on a conventional layout of a stereo sound box system, without being limited to the audio channel role information of the sound boxes, in this embodiment of this application. Relative locations of the plurality of sound boxes can be accurately determined, in combination with the first indication information used to indicate relative locations of one second sound box and the first sound box, by determining relative locations of the first sound box and the M second sound boxes and relative locations of the M second sound boxes. Then, the audio channel role information of the plurality of sound boxes can be accurately and quickly determined. In this way, the plurality of independent sound boxes can form the stereo sound box system, and a stereo effect can be generated when audio signals are played by using the plurality of sound boxes. In this way, these independent sound boxes that have no audio channel role information can be flexibly combined, and the audio channel roles of all the sound boxes can be configured, to form the stereo sound box system. Therefore, in this embodiment of this application, an audio channel configuration operation of the stereo sound box system including the plurality of sound boxes can be simplified, and factory setting of the audio channel role of the sound box is not required. This improves flexibility of using the sound boxes.

It should be noted that the first distance information includes distance information between the first sound box and each of the M second sound boxes.

It should be further noted that, when M is 2 or 3, in this embodiment of this application, only the first distance information may be obtained, the second distance information may not be obtained, and the audio channel role information of the first sound box and the M second sound boxes may be determined based on the first distance information and the first indication information. When M is an integer greater than 3, in this embodiment of this application, the first distance information and the second distance information may be obtained, and then the audio channel role information of the first sound box and the M second sound boxes is determined based on the first distance information, the second distance information, and the first indication information.

It should be noted that an execution body of the method for determining an audio channel role of a sound box provided in this embodiment of this application may be a sound box, a functional module and/or a functional entity that can implement the method in a sound box, a terminal device (for example, a mobile phone) connected to a sound box, or a functional module and/or a functional entity that can implement the method in a terminal device. When the execution body is the first sound box, the first sound box obtains the first distance information, the second distance information, and the first indication information, and determines the audio channel role information of the first sound box and the M second sound boxes based on the first distance information, the second distance information, and the first indication information. Different from that, when the execution body is a terminal device that establishes a wireless connection to the first sound box, the first sound box may obtain the first distance information, the second distance information, and the first indication information, and send the obtained information to the terminal device. After obtaining the information, the terminal device may determine the audio channel role information of the first sound box and the M second sound boxes based on the information.

In a possible implementation of the first aspect, the first distance information includes a distance value between the first sound box and each of the M second sound boxes, or the first distance information is used to indicate a distance relationship between the first sound box and the M second sound boxes.

Alternatively, the second distance information includes at least two distance values between the second sound box and the at least two other second sound boxes in the M second sound boxes, or the second distance information is used to indicate a distance relationship between the second sound box and the at least two other second sound boxes in the M second sound boxes.

In a possible implementation of the first aspect, the first indication information may be indication information input by a user, or may be any other indication information that meets an actual use requirement and that can be used to determine a relative location. Specifically, this may be determined based on the actual use requirement, and is not limited in this embodiment of this application.

In a possible implementation of the first aspect, the determining audio channel role information of the first sound box and the M second sound boxes based on the first distance information, the second distance information, and first indication information includes:

- the first sound box determines a first topological relationship between the first sound box and the M second sound boxes based on the first distance information and the second distance information, and determines the audio channel role information of the first sound box and the M second sound boxes based on the first topological relationship and the first indication information; or
- the first sound box determines a second topological relationship between the first sound box and the M second sound boxes based on the first distance information and the first indication information, and determines the audio channel role information of the first sound box and the M second sound boxes based on the second topological relationship and the second distance information.

In a possible implementation of the first aspect, the obtaining first distance information between a first sound box and M second sound boxes includes:

- the first sound box sends at least two detection signals to the M second sound boxes, where the at least two detection signals are signals sent by the first sound box at at least two different moments by using different transmit powers, and the at least two detection signals are in a one-to-one correspondence with the at least two different moments;
- the first sound box receives a response signal sent by each of the M second sound boxes, where the response signal is a response signal responding to one of the at least two detection signals, and the response signal sent by each second sound box includes an identifier of each second sound box; and
- the first sound box determines the first distance information based on the at least two detection signals and the response signal sent by each second sound box.

In this embodiment of this application, because a low transmit power corresponds to a short perception distance or a small perception range, and a high transmit power corresponds to a long perception distance or a large perception range, all the sound boxes may be sequentially detected by gradually adjusting (increasing or reducing) a transmit power. In this way, a distance relationship between all the sound boxes can be more accurately determined.

In a possible implementation of the first aspect, that the first sound box determines the first distance information based on the at least two detection signals and the response signal sent by each second sound box includes:

- the first sound box determines the first distance information based on a first correspondence, the at least two detection signals, and the response signal sent by each second sound box, where
- the first correspondence is used to indicate that different transmit powers of the first sound box correspond to the response signals sent by the M second sound boxes at different distances from the first sound box.

In a possible implementation of the first aspect, the obtaining second distance information between one second sound box and at least two other second sound boxes in the M second sound boxes includes:

- the first sound box sends a first message to the second sound box, where the first message is used to indicate the second sound box to obtain the second distance information; and
- the first sound box receives the second distance information sent by the second sound box.

In the foregoing solution, the first sound box can indicate one second sound box to obtain the second distance information, and obtain the second distance information from the second sound box. In this way, the first sound box can determine relative locations of all the second sound boxes based on the second distance information. This helps determine the relative locations of the first sound box and the M second sound boxes more accurately.

In a possible implementation of the first aspect, the method further includes:

- the first sound box sends a second message to any second sound box in the M second sound boxes, where the second message is used to indicate the any second sound box to output prompt information, and the prompt information is used to prompt the user to confirm the relative locations of the first sound box and the any second sound box in the M second sound boxes; and the first sound box receives the first indication information sent by the any second sound box, where the first indication information is information generated based on a user input responding to the prompt information.

In the foregoing technical solution, the relative locations of the first sound box and the any second sound box in the M second sound boxes are determined based on the first indication information input by the user, so that the relative locations of the first sound box and the M second sound boxes are determined based on the first distance information, the second distance information, and the first indication information. In this way, the audio channel role information of the first sound box and the M second sound boxes can be accurately and quickly determined based on relative locations of all the sound boxes.

In a possible implementation of the first aspect, the method further includes:

the first sound box establishes a wired connection or a wireless connection to each of the M second sound boxes; and the first sound box establishes a wired connection or a wireless connection to an audio source device, where the audio source device is configured to provide an audio signal to the first sound box.

In a possible implementation of the first aspect, after the determining audio channel role information of the first sound box and the M second sound boxes, the method further includes:

the first sound box receives a first audio signal sent by the audio source device, where the first audio signal includes an audio signal corresponding to audio channel role information of each of the M second sound boxes; and the first sound box sends, to each second sound box, an audio signal that is in the first audio signal and that corresponds to the audio channel role information of each second sound box.

In a possible implementation of the first aspect, after the determining audio channel role information of the first sound box and the M second sound boxes, the method further includes: The first sound box sends, to each of the M second sound boxes, audio channel role information corresponding to each second sound box.

After receiving the corresponding audio channel role information, each second sound box stores the audio channel role information. When the first sound box receives a second audio signal sent by the audio source device, the first sound box may send the second audio signal to each of the M second sound boxes. After receiving the second audio signal, each second sound box plays the second audio signal based on the audio channel role information corresponding to each second sound box.

According to a second aspect, this application provides an apparatus for determining an audio channel role of a sound box. The apparatus includes a unit configured to perform the method according to the first aspect. The apparatus may correspondingly perform the method described in the first aspect. For related descriptions of the unit in the apparatus, refer to the descriptions of the first aspect. For brevity, details are not described herein again.

According to a third aspect, this application provides a system for determining an audio channel role of a sound box, including a first sound box and M second sound boxes.

The first sound box is configured to send at least two detection signals to the M second sound boxes.

Each of the M second sound boxes is configured to send a response signal to the first sound box when receiving one of the at least two detection signals.

The first sound box is further configured to: receive the response signal sent by each second sound box, and determine first distance information between the first sound box and each of the M second sound boxes based on the at least two detection signals and the response signal sent by each second sound box.

The first sound box is further configured to: obtain second distance information between one second sound box and at least two other second sound boxes in the M second sound boxes, and determine audio channel role information of the first sound box and the M second sound boxes based on the first distance information, the second distance information, and first indication information.

The first indication information is used to indicate relative locations of the first sound box and any of the M second sound boxes, and M is an integer greater than 1.

The system may correspondingly perform the method described in the first aspect. For related descriptions of the first sound box and the M second sound boxes in the system, refer to the descriptions of the first aspect. For brevity, details are not described herein again.

According to a fourth aspect, this application provides an electronic device. The electronic device includes a processor, and the processor is coupled to a memory. The memory is configured to store a computer program or instructions. The processor is configured to execute the computer program or the instructions stored in the memory, so that the method in the first aspect is performed.

For example, the processor is configured to execute the computer program or the instructions stored in the memory, so that the apparatus is enabled to perform the method in the first aspect.

According to a fifth aspect, this application provides a computer-readable storage medium. The computer-readable storage medium stores a computer program (which may also be referred to as instructions or code) used to implement the method in the first aspect.

For example, when the computer program is executed by a computer, the computer is enabled to perform the method in the first aspect.

According to a sixth aspect, this application provides a chip, including a processor. The processor is configured to read and execute a computer program stored in a memory, to perform the method according to any one of the first aspect or the possible implementations of the first aspect.

Optionally, the chip further includes a memory, and the memory is connected to the processor by using a circuit or a wire.

According to a seventh aspect, this application provides a chip system, including a processor. The processor is configured to read and execute a computer program stored in a memory, to perform the method according to any one of the first aspect or the possible implementations of the first aspect.

Optionally, the chip further includes a memory, and the memory is connected to the processor by using a circuit or a wire.

According to an eighth aspect, this application provides a computer program product. The computer program product includes a computer program (which may also be referred to as instructions or code), and when the computer program is executed by a computer, the computer is enabled to implement the method according to the first aspect.

It may be understood that, for beneficial effects of the second aspect to the eighth aspect, refer to related descriptions in the first aspect. Details are not described herein again.

DETAILED DESCRIPTION OF ILLUSTRATIVE EMBODIMENTS

The following describes the technical solutions in embodiments of this application with reference to the accompanying drawings in the embodiments of this application.

In descriptions of this application, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, unless otherwise specified, "a plurality of" in the descriptions of this application means two or more than two. In addition, to clearly describe the technical solutions in embodiments of this application, the terms "first", "second", and the like in embodiments of this application are intended to distinguish between different objects, or are intended to distinguish between different processing of a same object, but are not intended to describe a particular order of the objects.

Reference to "an embodiment", "some embodiments", or the like described in the specification of this application indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean reference to a same embodiment, instead, they mean "one or more but not all of embodiments", unless otherwise specifically emphasized. The terms "include", "comprise", "have", and their variants all mean "include but are not limited to", unless otherwise specifically emphasized.

Figure 1:
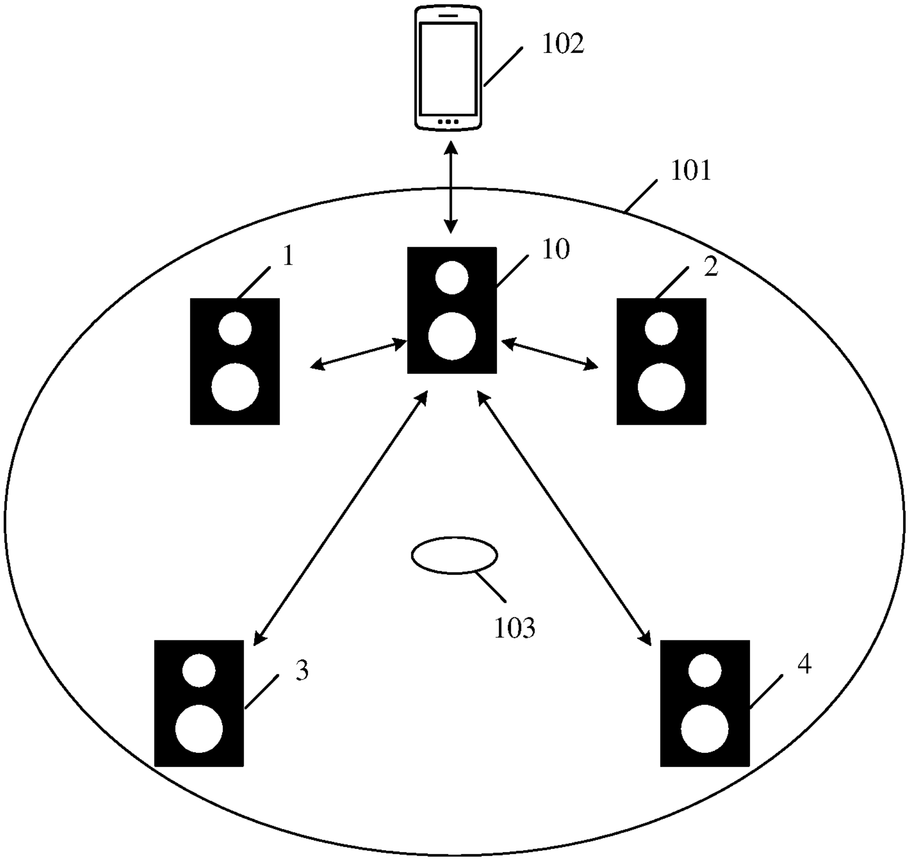
FIG. 1 is a schematic diagram of an architecture of a stereo sound box system according to an embodiment of this application.

FIG. 1 is a schematic diagram of a system architecture in each example embodiment of this application. As shown in FIG. 1, the system architecture includes a sound box system 101, an audio source device 102 that provides an audio signal to the sound box system 101, and a reference location 103. The sound box system 101 includes a primary sound box 10 and at least four secondary boxes. As shown in FIG. 1, the at least four secondary boxes include a secondary box 1, a secondary box 2, a secondary box 3, and a secondary box 4. It should be noted that FIG. 1 shows only four secondary boxes, and certainly may further include more secondary boxes.

In some embodiments, the primary sound box 10 establishes network connections to the at least four secondary boxes, for example, through a wired connection or a wireless connection (for example, a Bluetooth connection). For example, that the primary sound box 10 establishes Bluetooth connections to the at least four secondary boxes is used as an example. The primary sound box 10 may search for a nearby secondary box whose Bluetooth function is enabled, match a found secondary box, and establish a Bluetooth connection to the secondary box. In this way, the primary sound box 10 and the at least four secondary boxes may communicate with each other through the Bluetooth connections.

In some embodiments, the primary sound box 10 and the audio source device 102 are connected through a wired network or a wireless network (for example, a Bluetooth connection). In this case, the audio source device 102 may provide an audio signal to the primary sound box 101 through the wired network or the wireless network. A specific form of the audio source device 102 is not specially limited in embodiments of this application. For example, the audio source device 102 may be a terminal device that can provide the audio signal, such as a mobile phone, a tablet computer, a personal computer, a personal digital assistant, a smartwatch, a netbook, or a wearable electronic device.

An application (application, APP) that can interact with a sound box system may be installed on the terminal device. The terminal device may be directly connected to a primary sound box (or a secondary box) of the sound box system in a wireless or wired manner for interaction. For example, the terminal device may establish a connection to the primary sound box (or the secondary box) through Bluetooth or a data cable. Alternatively, the terminal device may interact with the primary sound box of the sound box system by using a cloud server.

For example, as shown in FIG. 1, the primary sound box 10 is connected to a mobile phone 102. The mobile phone 102 may send the audio signal to the primary sound box 10. After receiving the audio signal, the primary sound box 10 sends the audio signal to all secondary boxes, so that the primary sound box 10 and all secondary boxes play the audio signal.

Figure 2:
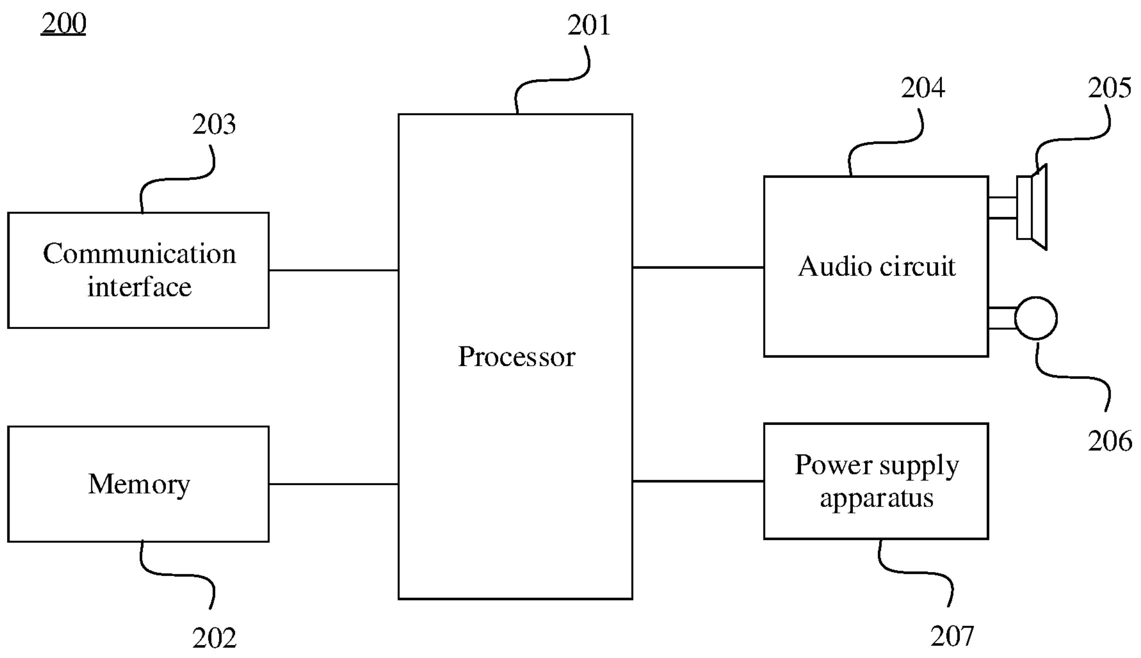
FIG. 2 is a schematic diagram of a structure of a sound box according to an embodiment of this application.

FIG. 2 is a functional block diagram of a sound box 200 according to an embodiment of this application. The sound box 200 may be an example of the primary sound box 10 (or all secondary boxes) described in FIG. 1. As shown in FIG. 2, the sound box 200 may include a processor 201, a memory 202, a communication interface 203, an audio circuit 204, a speaker 205, a microphone 206, a power supply apparatus 207, and the like. These components may communicate with each other by using one or more communication buses or signal cables (not shown in the figure). The following describes all components of the sound box 200 in detail with reference to FIG. 2.

The processor 201 is a control center of the sound box, and is connected to various components of the sound box through various interfaces and lines. The processor 201 performs various functions of the sound box and processes data by running or executing an application stored in the memory 202 and invoking data stored in the memory 202. In some embodiments, the processor 201 may include one or more processing units.

The memory 202 is configured to store an application and data. The processor 201 performs various functions of the sound box and processes data by running the application and the data that are stored in the memory 202. The memory 202 mainly includes a program storage area and a data storage area. The program storage area may store an operating system and an application required by at least one function (for example, a sound playing function or a voice collecting function). The data storage area may store data (for example, audio data) created during use of the sound box. In addition, the memory 202 may include a high-speed random access memory (random access memory, RAM), or may include a nonvolatile memory such as a magnetic disk storage device, a flash memory device, or another volatile solid-state storage device. The memory 202 may store various operating systems. The memory 202 may be independent of the processor 201, and is connected to the processor 201 by using the communication bus. Alternatively, the memory 202 and the processor 201 may be integrated together.

The sound box 200 is connected to other devices such as another sound box, mobile phone, or TV by using the communication interface 203. For example, the communication interface 203 may be a radio frequency circuit, a Bluetooth apparatus, a Wi-Fi apparatus, or a signal transmission line interface. For example, the communication interface 203 may be configured to perform communication between a primary sound box and a secondary box, between the primary sound box and an audio source device, or between the primary sound box and a server.

The audio circuit 204 is connected to the speaker 205 and the microphone 206. In one aspect, the audio circuit 204 may transmit an electrical signal obtained by converting received audio data to the speaker 205, and the speaker 205 converts the electrical signal into a sound signal for output. In another aspect, the microphone 206 converts a collected sound signal (for example, a voice sent by a user) into an electrical signal, and the audio circuit 204 receives the electrical signal and converts the electrical signal into audio data (or voice data), and then outputs the audio data. For example, the secondary box sends the voice data to the primary sound box. Alternatively, the primary sound box sends the voice data to the server, or outputs the voice data to the memory 202 for further processing.

The power supply apparatus 207 may supply power to all components. For example, the power supply apparatus 207 includes a battery and a power management chip. The battery may be logically connected to the processor 201 by using the power management chip, so that functions such as charging, discharging, and power consumption management are implemented by using the power supply apparatus 207.

In some embodiments, the sound box 200 may further include a display (or a display), or may not include a display. The display may be configured to display a display interface of an APP, for example, a currently played song. The display includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a quantum dot light-emitting diode (quantum dot light-emitting diode, QLED), or the like. In some embodiments, a touch sensor may be disposed on the display to form a touchscreen. This is not limited in this embodiment of this application. The touch sensor is configured to detect a touch operation performed on or near the touch sensor. The touch sensor may transfer the detected touch operation to the processor 201, to determine a touch event type. The processor 201 may provide a visual output related to the touch operation through the display.

In some embodiments, the sound box 200 may further include more components such as a USB interface. Details are not described in this embodiment of this application. It may be understood that the components shown in FIG. 2 do not constitute a specific limitation on the sound box 200. The sound box 200 may further include more or fewer components than those shown in the figure, or some components may be combined, or some components may be split, or there may be a different component arrangement.

In some embodiments, structures of the primary sound box and the secondary box may be the same. In some other embodiments, structures of the primary sound box and the secondary box may alternatively be different. For example, a display may be disposed on the primary sound box, but no display is disposed on the secondary box. In other embodiments, functions of some components in the primary sound box and the secondary box may be different. For example, a processor in the primary sound box may have a function of processing an audio signal, but a processor in the secondary box does not have this function.

In some embodiments, whether a sound box is the primary sound box or the secondary box may be set before the sound box is delivered, or may be user-defined (for example, the user determines whether the sound box is the primary sound box or the secondary box by using an input on a touch display of the sound box).

In the following embodiments of this application, the system architecture in FIG. 1 is used as an example. The primary sound box and/or secondary boxes shown in FIG. 1 are the sound box 200 shown in FIG. 2. For ease of understanding embodiments of this application, the following describes a part of terms in embodiments of this application, to help a person skilled in the art have a better understanding.

(1) Audio channel: The audio channel indicates mutually-independent audio signals collected or played back at different spatial locations during audio recording or playing. Therefore, a quantity of audio channels is a quantity of audio sources during audio recording or a quantity of corresponding speakers used for audio playing.

(2) 5-channel: a central audio channel, a front left audio channel, a front right audio channel, a rear left audio channel, and a rear right audio channel.

(3) Audio channel role information: Audio channel role information of a sound box is used to describe a channel of audio signals that can be played by the sound box. For example, if the audio channel role information of the sound box is a front left audio channel, the sound box can play an audio signal of the front left audio channel. A sound box corresponding to specific audio channel role information may play an audio signal of a specific audio channel. In other words, all sound boxes having different audio channel role information separately play audio signals of different audio channels.

(4) 5-channel sound box system: It is a stereo sound box system including five sound boxes corresponding to different audio channel role information. The five sound boxes are placed at specific locations to separately play audio signals of different audio channels, to form a stereo surround sound effect.

Certainly, there are other multi-channel sound box systems in addition to the 5-channel sound box system. For example, in a 6-channel sound box system, audio channel role information of all sound boxes may be a central audio channel, a front left audio channel, a front right audio channel, a central left audio channel, a central right audio channel, and a rear audio channel. For another example, in a 7-channel sound box system, audio channel role information of all the sound boxes may be a central audio channel, a front left audio channel, a front right audio channel, a central left audio channel, a central right audio channel, a rear left audio channel, and a rear right audio channel. It should be noted that the channel role information is an example for description. A specific naming manner of the channel role information is not limited in embodiments of this application. For example, the rear left audio channel may also be referred to as a rear left surround audio channel. Specifically, the naming manner of the channel role information may be determined based on an actual situation, and is not limited in embodiments of this application.

The following uses the 5-channel sound box system as an example for description. For ease of description, a sound box configured to play an audio signal of the central audio channel may be referred to as a central sound box (for example, corresponding to the primary sound box 10 in FIG. 1), a sound box configured to play an audio signal of the front left audio channel may be referred to as a front left sound box (for example, corresponding to the secondary box 1 in FIG. 1), a sound box configured to play an audio signal of the front right audio channel may be referred to as a front right sound box (for example, corresponding to the secondary box 2 in FIG. 1), a sound box configured to play an audio signal of the rear left audio channel may be referred to as a rear left sound box (for example, corresponding to the secondary box 3 in FIG. 1), and a sound box configured to play an audio signal of the rear right audio channel may be referred to as a rear right sound box (for example, corresponding to the secondary box 4 in FIG. 1).

Currently, audio channel role information of each sound box in the stereo sound box system needs to be preconfigured before delivery, and the audio channel role information needs to be marked on each sound box. In the process of indoor sound box arrangement and multi-channel configuration, a configuration person needs to place all the sound boxes at corresponding locations based on the preconfigured audio channel role information. For example, a sound box (namely, the central sound box) marked with the central audio channel is placed directly in front of a reference location (a location 103 shown in FIG. 1). A sound box (namely, the left sound box) marked with the front left audio channel is placed in a left front location. A sound box (namely, the right sound box) marked with the front right audio channel is placed in a right front location. In this way, other sound boxes are placed at corresponding locations based on the preconfigured audio channel role information. In the foregoing multi-channel configuration manner, all the sound boxes need to be placed at corresponding locations strictly based on the preconfigured audio channel role information. However, because a capacity and experience of the configuration person are limited, a process of configuring an audio channel of a sound box is often tedious and complex. Therefore, based on a user requirement of forming the stereo sound box system by the plurality of sound boxes, a current process of configuring an audio channel role of a sound box needs to be improved.

Based on the application scenario, system architecture, and hardware configuration, embodiments of this application provide a method for determining an audio channel role of a sound box. In embodiments of this application, a plurality of independent sound boxes (including the first sound box and the M second sound boxes) whose audio channel roles are not preconfigured may be freely placed based on a conventional layout of a stereo sound box system, without being limited to the audio channel role information of the sound boxes. Relative locations of the plurality of sound boxes may be accurately determined, in combination with first indication information used to indicate relative locations of one second sound box and the first sound box, by determining relative locations of the first sound box and the M second sound boxes and relative locations of the M second sound boxes. Then, audio channel role information of the plurality of sound boxes can be accurately and quickly determined. In this way, the plurality of independent sound boxes can form the stereo sound box system, and a stereo effect can be generated when audio signals are played by using the plurality of sound boxes. In this way, these independent sound boxes that have no audio channel role information can be flexibly combined, and the audio channel roles of all the sound boxes can be configured, to form the stereo sound box system. Therefore, in embodiments of this application, an audio channel configuration operation of the stereo sound box system including the plurality of sound boxes can be simplified, and factory setting of the audio channel role of the sound box is not required. This improves flexibility of using the sound boxes.

It should be noted that an execution body of the method for determining an audio channel role of a sound box provided in embodiments of this application may be a sound box (for example, a primary sound box or another sound box), a functional module and/or a functional entity that can implement the method in a sound box, a terminal device (for example, a mobile phone) connected to a primary sound box, or a functional module and/or a functional entity that can implement the method in a terminal device. Specifically, this may be determined based on an actual use requirement, and is not limited in embodiments of this application. The following uses an example in which the execution body is the sound box (referred to as the first sound box below) to describe the method for determining an audio channel role of a sound box provided in embodiments of this application.

In embodiments of this application, the user has a plurality of sound boxes that can be independently used, and the plurality of sound boxes are not sound boxes in a stereo sound box system currently sold in sets; in other words, audio channel roles of the plurality of sound boxes are not preconfigured. In this case, if the user needs to obtain a stereo sound box system by using the plurality of sound boxes, to implement a stereo sound effect of audio, the user may place the plurality of independent sound boxes based on a conventional layout (as shown in FIG. 1) of the stereo sound box system. Then, the user performs an operation on a sound box or on a mobile phone connected to the sound box, to trigger implementation of the method for determining an audio channel role of a sound box provided in embodiments of this application to configure a sound box audio channel, so that the plurality of sound boxes may form the stereo sound box system. For ease of description, one sound box in the plurality of sound boxes is referred to as the first sound box, and another sound box other than the first sound box in the plurality of sound boxes is referred to as a second sound box.

It should be noted that, different from a conventional manner of placing the plurality of sound boxes in the stereo sound box system at corresponding locations based on sound box channel role information, in embodiments of this application, the plurality of independent sound boxes that have no sound box channel role information can be freely placed based on a layout shown in FIG. 1, without being limited by the audio channel role information of the sound boxes. In this way, these independent sound boxes having no audio channel role information can be flexibly combined to configure audio channel roles of all sound boxes to form the stereo sound box system.

Figure 3:
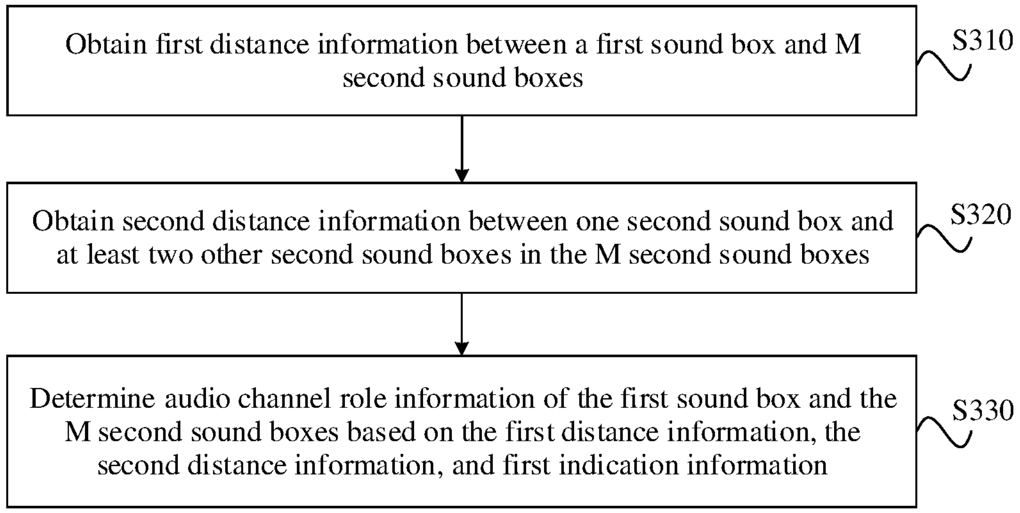
FIG. 3 is a first schematic flowchart of a method for determining an audio channel role of a sound box according to an embodiment of this application.

The following describes, with reference to the accompanying drawings, an example of the method for determining an audio channel role of a sound box provided in embodiments of this application. FIG. 3 is a first schematic flowchart of a method for determining an audio channel role of a sound box according to an example embodiment. Refer to FIG. 3. The method includes the following steps S310 to S330.

S310: Obtain first distance information between a first sound box and M second sound boxes.

In this embodiment of this application, a plurality of independent sound boxes are placed based on a layout shown in FIG. 1. The first sound box may be any of the plurality of independent sound boxes. For example, the first sound box may be a central sound box, or may be a secondary box other than the central sound box in the plurality of independent sound boxes. In addition, the first sound box may be a primary sound box, and the M second sound boxes may be secondary boxes controlled by the primary sound box. Certainly, the first sound box may alternatively be a non-primary sound box, and correspondingly, the M second sound boxes may include the primary sound box. Optionally, performance of the first sound box may be the same as or different from that of the M second sound boxes (for example, performance of the first sound box is better than that of each second sound box). In addition, performance of the M second sound boxes may be the same, or may be different. Specifically, this may be determined based on an actual use requirement, and is not limited in this embodiment of this application. For ease of description, in the following embodiments, an example in which the first sound box is the central sound box and the central sound box is the primary sound box is used for description.

In S310, M may be an integer greater than 1. For example, when M=2, the first sound box and the M second sound boxes may form a 3-channel sound box system. When M=3, the first sound box and the M second sound boxes may form a 4-channel sound box system. When M=4, the first sound box and the M second sound boxes may form a 5-channel sound box system. When M=5, the first sound box and the M second sound boxes may form a 6-channel sound box system. When M=6, the first sound box and the M second sound boxes may form a 7-channel sound box system. For ease of description, in the following embodiments, M=4 is used as an example for description.

In a possible implementation, before the first sound box obtains the first distance information, the first sound box establishes a wired connection or a wireless connection to each of the M second sound boxes, and the first sound box establishes a wired connection or a wireless connection to an audio source device.

In a possible implementation, before the first sound box obtains the first distance information, a user may perform an input (for example, a press input or a voice input) on the first sound box, to trigger the first sound box to enable an audio channel configuration function. When the first sound box enables the audio channel configuration function, the first sound box starts to perform steps S310 to S330. For example, the user presses a function key on the central sound box to trigger the audio channel configuration function to be enabled. For another example, the central sound box collects a sound signal (for example, a sound signal sent by the user) (by using a microphone). If the central sound box determines (by using a processor) that the sound signal includes a "wake-up word+audio channel configuration", the central sound box enables the audio channel configuration function.

Optionally, in S310, a distance perception technology may be used to perceive distances (corresponding to the first distance information) between the first sound box and the M second sound boxes in this embodiment of this application. For example, the distance perception technology may be a manner of perceiving a distance based on a radio signal (for example, a Wi-Fi signal or a Bluetooth signal), or may be a manner of perceiving a distance based on a sound wave signal (for example, an ultrasonic signal), or may be a manner of perceiving a distance based on a light signal (for example, an infrared signal), or may be any other manner of perceiving a distance based on an actual use requirement. Specifically, this may be determined based on the actual use requirement, and is not limited in this embodiment of this application.

For example, the Wi-Fi signal is used to perceive the distance. For example, a ranging technology based on received signal strength indication (received signal strength indication, RSSI) is used. The first sound box broadcasts the Wi-Fi signal, and a second sound box that receives the Wi-Fi signal feeds back a signal to the first sound box. The first sound box may calculate a distance between the first sound box and the second sound box based on strength of the received signal.

Figure 4:
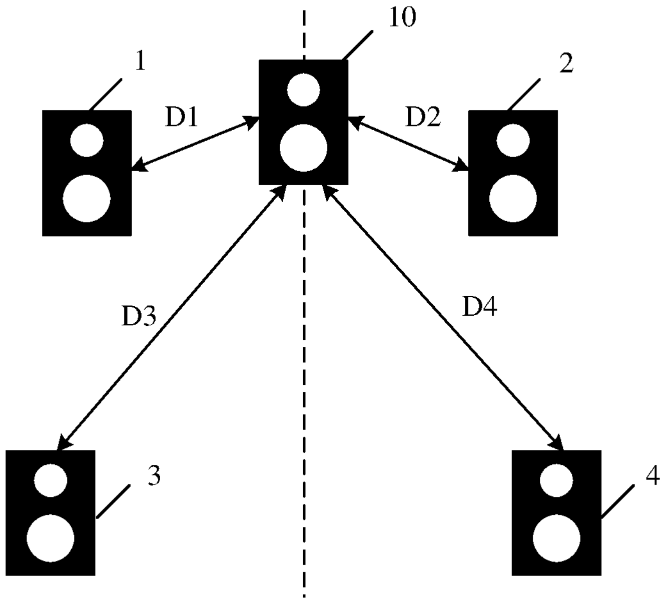
FIG. 4 is a first schematic diagram of performing distance perception in a system architecture according to an embodiment of this application.

Optionally, a specific representation form of the first distance information may include but is not limited to the following two forms:

Form 1: In S310, the first distance information may include a distance value between the first sound box and each of the M second sound boxes, that is, the first distance information includes M distance values. For example, as shown in FIG. 4, it is assumed that the first sound box is a central sound box 10, and the M second sound boxes are respectively the secondary box 1, the secondary box 2, the secondary box 3, and the secondary box 4. If distance values between the central sound box 10 and the four secondary boxes are respectively a first distance value (denoted as D1), a second distance value (denoted as D2), a third distance value (denoted as D3), and a fourth distance value (denoted as D4), the first distance information includes D1, D2, D3, and D4. Further, a distance relationship between the first sound box and all second sound boxes may be determined by comparing these distance values. For example, if a difference between D1 and D2 is within a preset range and a difference between D3 and D4 is within the preset range, it may be determined that both the secondary box 1 and the secondary box 2 are close to the central sound box, and the secondary box 3 and the secondary box 4 are far away from the central sound box.

Form 2: In S310, the first distance information may alternatively be information used to indicate distance relationships between the first sound box and the M second sound boxes. For example, it is assumed that the first sound box is the central sound box and the M second sound boxes are respectively the secondary box 1, the secondary box 2, the secondary box 3, and the secondary box 4. If the first distance information indicates that both the secondary box 1 and the secondary box 2 are close to the central sound box, and both the secondary box 3 and the secondary box 4 are far away from the central sound box, based on a layout of the sound boxes in the stereo sound box system shown in FIG. 4, two sound boxes close to the central sound box 10 may be respectively used as a left sound box and a right sound box, and two sound boxes far away from the central sound box 10 may be respectively used as a rear left sound box and a rear right sound box.

In other words, based on the first distance information, it may be determined that one of the secondary box 1 and the secondary box 2 may be used as a front left sound box, and the other may be used as a front right sound box. One of the secondary box 3 and the secondary box 4 may be used as the rear left sound box and the other may be used as the rear right sound box.

S320: Obtain second distance information between one second sound box and at least two other second sound boxes in the M second sound boxes.

Figure 5:
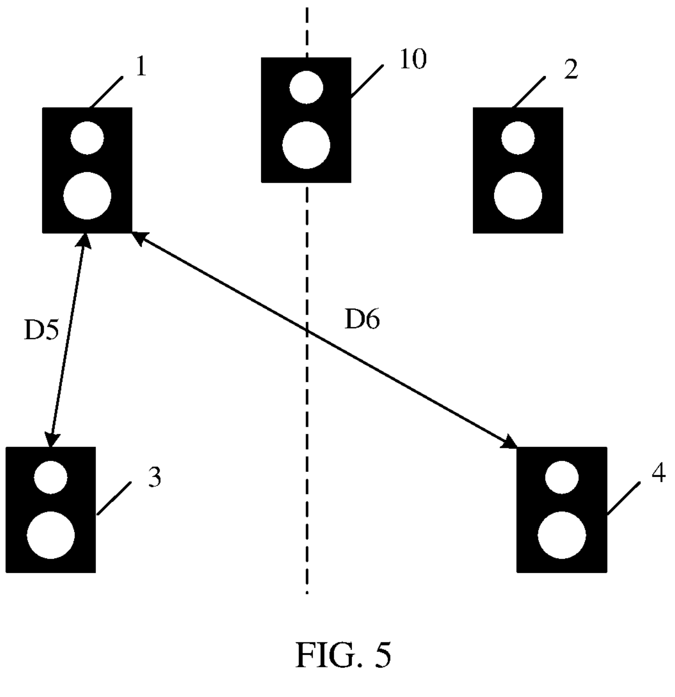
FIG. 5 is a second schematic diagram of performing distance perception in a system architecture according to an embodiment of this application.

In S320, as shown in FIG. 5, it is assumed that the first sound box is the central sound box 10, and the M second sound boxes are respectively the secondary box 1, the secondary box 2, the secondary box 3, and the secondary box 4. For example, if the second sound box in the M second sound boxes is the secondary box 1, a distance value (denoted as D5) between the secondary box 1 and the secondary box 3 and a distance value (denoted as D6) between the secondary box 1 and the secondary box 4 may be obtained, and a distance value between the secondary box 1 and the secondary box 2 may also be obtained. It may be understood that an example in which the second sound box in the M second sound boxes is the secondary box 1 is used for description herein. In actual implementation, second distance information between any other second sound box (for example, the secondary box 3) in the M second sound boxes and the at least two other second sound boxes (for example, the secondary box 1 and the secondary box 2) may be obtained. Specifically, this may be determined based on an actual use requirement, and is not limited in this embodiment of this application.

In S320, for a manner of obtaining the second distance information, refer to the specific implementation of obtaining the first distance information described in step S310. In addition, specific implementations of the manner of obtaining the second distance information and the manner of obtaining the first distance information may be the same. For example, both the first distance information and the second distance information may be obtained in the manner of perceiving the distance based on the Wi-Fi signal. Alternatively, specific implementations of the manner of obtaining the second distance information and the manner of obtaining the first distance information may be different. For example, the first distance information is obtained in the manner of perceiving the distance based on the Wi-Fi signal, and the second distance information is obtained in the manner of perceiving the distance based on the ultrasonic signal. Specifically, this may be determined based on an actual use requirement, and is not limited in this embodiment of this application.

Optionally, a specific representation form of the second distance information may include but is not limited to the following two forms:

Form 1: In S320, the second distance information may include distance values between the second sound box in the M second sound boxes and each of the at least two other second sound boxes, that is, the second distance information includes at least two distance values. For example, it is assumed that the distance values between the secondary box 1 and the secondary box 3 and between the secondary box 1 and the secondary box 4 are respectively D5 and D6 (as shown in FIG. 5). The second distance information may include D5 and D6. Further, a distance relationship between the second sound box and the at least two other second sound boxes in the M second sound boxes may be determined by comparing these distance values. For example, as shown in FIG. 5, if D6 is greater than D5, it may be determined that the secondary box 1 and the secondary box 3 are located on a same side of the central sound box, and the secondary box 1 and the secondary box 4 are located on the left and right sides of the central sound box.

Form 2: In S320, the second distance information may alternatively be information used to indicate a distance relationship between the second sound box and the at least two other second sound boxes in the M second sound boxes. For example, if the second distance information indicates that the secondary box 1 is close to the secondary box 3, and the secondary box 1 is far away from the secondary box 4, it can be learned based on a layout of the sound boxes in the stereo sound box system shown in FIG. 5, the secondary box 1 and the secondary box 3 located on the same side of the central sound box are close to each other, and the secondary box 1 and the secondary box 4 located on both sides of the central sound box are far away from each other. In other words, based on the second distance information, it may be determined that the secondary box 1 and the secondary box 3 are located on the same side of the central sound box, and the secondary box 1 and the secondary box 4 are located on the left and right sides of the central sound box.

S330: Determine audio channel role information of the first sound box and the M second sound boxes based on the first distance information, the second distance information, and first indication information.

It should be noted that, when M is 2 or 3, in this embodiment of this application, only the first distance information may be obtained, the second distance information may not be obtained, and the audio channel role information of the first sound box and the M second sound boxes may be determined based on the first distance information and the first indication information. When M is an integer greater than 3, in this embodiment of this application, the first distance information and the second distance information may be obtained, and then the audio channel role information of the first sound box and the M second sound boxes is determined based on the first distance information, the second distance information, and the first indication information.

In a possible implementation, the first indication information is used to indicate relative locations of any two sound boxes in M+1 sound boxes (including the first sound box and the M second sound boxes).

In S330, the first indication information is used to indicate relative locations of the first sound box and any second sound box in the M second sound boxes. For example, the first indication information may indicate that the any second sound box is located on the left side or the right side of the first sound box. For example, the first indication information may be used to indicate that the secondary box 1 is located on the left side of the central sound box, that is, it may be determined, based on the first indication information, that the secondary box 1 is the front left sound box or the rear left sound box.

Alternatively, the first indication information is used to indicate relative locations of any second sound box in the M sound boxes relative to another second sound box. For example, the first indication information may indicate that the any second sound box is located on the left side or the right side of the another second sound box. For example, the first indication information may be used to indicate that the secondary box 1 is located on the left side of the secondary box 2.

It should be noted that the first indication information may be indication information input by the user, or may be any other indication information that meets an actual use requirement and that can be used to determine a relative location. Specifically, this may be determined based on the actual use requirement, and is not limited in this embodiment of this application.

For example, the user inputs the first indication information. The central sound box may query the user about whether a sound box in the M sound boxes is located on the left side or the right side of the central sound box (for example, the sound box can give a prompt in a blinking form). Correspondingly, the user inputs the first indication information on the central sound box. For example, the central sound box may display two options on a screen (for example, “Yes” and “No” options, or “Left” and “Right” options). In this case, the user may select an option on the screen of the central sound box according to an actual orientation to indicate a relative location of the currently queried sound box relative to the central sound box. For another example, the user may press a volume button on the central sound box according to an actual orientation (for example, a volume+button indicates the left side, and a volume−button indicates the right side) to indicate a relative location of the currently queried sound box relative to the central sound box. After receiving an input of the user on the volume button (for example, the volume+button and the volume−button) of the central sound box, the central sound box determines whether the queried sound box is located on the left side or the right side of the central sound box. For another example, the central sound box may further query by using a voice. For example, the queried voice content is “whether a sound box whose light is currently blinking is located on the left side or on the right side of the central sound box”. In this case, the user may answer in a voice manner, for example, the answered voice content is “left side”. In this way, when the user inputs the first indication information, the central sound box may obtain the first indication information.

It may be understood that the sound box in the M sound boxes may also query the user in the example manner about whether the sound box is located on the left side or on the right side of the central sound box (for example, the sound box can give a prompt in a blinking form). After receiving an input of the user on the sound box, the sound box sends, to the central sound box, the relative location result corresponding to the input. In this way, when the user inputs the first indication information, the central sound box may obtain the first indication information.

For example, the sound box 1 may determine, by receiving a volume+button input of the user on the sound box 1, that the sound box 1 is located on the left side of the central sound box, and then the sound box 1 sends a relative location result of the sound box 1 to the central sound box.

It should be further noted that, in this embodiment of this application, the user may be allowed to input the first indication information in various manners. Specifically, this may be determined based on the actual use requirement, and is not limited in this embodiment of this application. In addition, in this embodiment of this application, an example in which relative locations of sound boxes are determined from a perspective of the reference locations shown in FIG. 1 is used for description. Specifically, this may be determined based on the actual use requirement, and is not limited in this embodiment of this application.

Figure 6A:
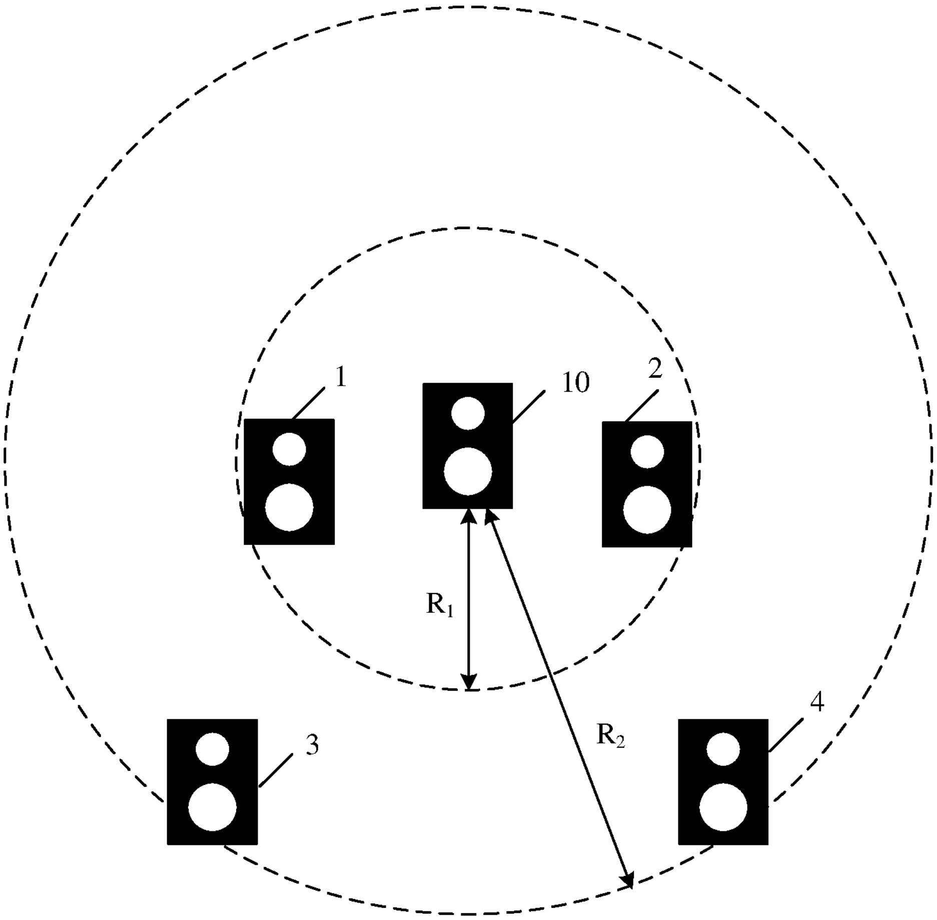
FIG. 6A is a third schematic diagram of performing distance perception in a system architecture according to an embodiment of this application.
Figure 6B:
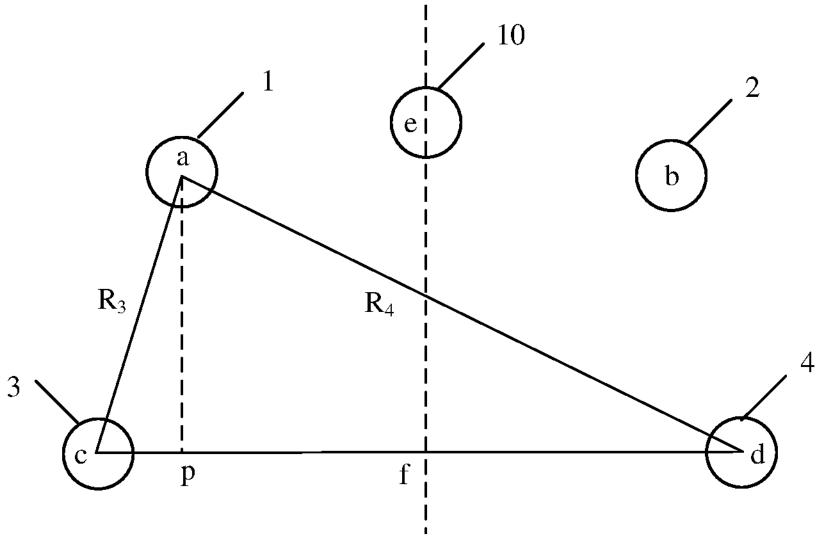
FIG. 6B is a fourth schematic diagram of performing distance perception in a system architecture according to an embodiment of this application.

The following describes, with reference to FIG. 6A and FIG. 6B, and by using the following three steps and an example in which a 5-channel sound box system includes five sound boxes (a central audio channel, a front left audio channel, a front right audio channel, a rear left audio channel, a rear audio right channel), the method for determining an audio channel role of a sound box provided in embodiments of this application.

Step 1: The central sound box perceives distances between the central sound box and all secondary boxes and determines horizontal types (front left/right type or rear left/right type) of audio channels of the secondary boxes.

As shown in FIG. 6A, the central sound box 10 perceives that distances between the central sound box 10 and the secondary box 1 and between the central sound box 10 and the secondary box 2 are both $R_1$. The central sound box 10 perceives that distances between the central sound box 10 and the secondary box 3 and between the central sound box 10 and the secondary box 4 are both $R_2$. $R_1<R_2$.

Nodes at a same distance from the central sound box 10 have the same horizontal types of audio channels. Therefore, horizontal types (denoted as T1) of audio channels of the secondary box 1 and the secondary box 2 are the same, and horizontal types (denoted as T2) of audio channels of the secondary box 3 and the secondary box 4 are the same.

Because $R_1<R_2$, in a five-channel scenario, it may be determined that T1 is the front left/right type, and T2 is the rear left/right type.

Step 2: The secondary box 1 perceives distances between the secondary box 1 and the secondary box 3 and between the secondary box 1 and the secondary box 4, and determines vertical types (left or right) of audio channels.

As shown in FIG. 6B, the secondary box 1 perceives that a distance between the secondary box 1 and the secondary box 3 is $R_3$, and the secondary box 1 perceives that a distance between the secondary box 1 and the secondary box 4 is R 4. The secondary box 3 and the secondary box 4 are basically symmetrically placed with respect to a dotted line of the central sound box 10. It is assumed that the secondary box 1 corresponds to a node a, the secondary box 2 corresponds to a node b, the secondary box 3 corresponds to a node c, and the secondary box 4 corresponds to a node d. The node a, the node c, and the node d form a triangle acd. In the triangle acd, an edge ac=$R_3$, an edge ad=$R_4$, a line segment ap is perpendicular to a line segment cd, and a dotted line of is perpendicular to the line segment cd.

Because $R_3^2=(ap)^2+(cp)^2$, and $R_4^2=(ap)^2+(dp)^2$, $R_4^2-R_3^2=(dp)^2-(cp)^2$;

because $dp=df+fp$, and $cp=fc-fp$, $R_4^2-R_3^2=(df)^2+2\times(df)\times(fp)-(fc)^2+2\times(fc)\times(fp)$; and because $fc=df$, $R_4^2-R_3^2=4\times(fc)\times(fp)>0$; and therefore, $R_4>R_3$.

When the secondary box 1 and the secondary box 3 are located on the same side (for example, the left side) of the central sound box 10, $R_3$ is necessarily smaller than $R_4$, that is, $R_3$ and $R_4$ may be compared to determine whether the secondary box 1 and the secondary box 3 are on the same side (determine whether vertical types are the same).

If it is determined that $R_4>R_3$, it may be determined that vertical types of the secondary box 1 and the secondary box 3 are the same, that is, it may be determined that the secondary box 1 and the secondary box 3 are located on the same side of the central sound box 10.

Step 3: Manually confirm left and right roles of a single sound box.

Based on the first two steps, it may be learned that:

The secondary box 1 and secondary box 2 are front sound boxes. The secondary box 3 and the secondary box 4 are rear sound boxes.

The secondary box 1 and the secondary box 3 are on the same side. The secondary box 2 and the secondary box 4 are on the same side.

In other words, the secondary box 1 is the front left sound box or the front right sound box, and the secondary box 3 is a rear left sound box or a rear right sound box (a left/right attribute of the secondary box 3 is consistent with that of the secondary box 1).

In this case, after the user determines the left/right attribute of the secondary box 1 through a button input, the left/right attribute of the secondary box 3 is also determined accordingly, and left and right attributes of the secondary box 2 and the secondary box 3 are also determined accordingly.

Based on the three steps, audio channel roles of all sound boxes may be automatically set without additional assistance of an APP. This improves efficiency of setting audio channels of the sound boxes and ensures flexibility of using the sound boxes.

The following describes, by way of example, a specific implementation of determining the audio channel role information of the first sound box and the M second sound boxes based on the first distance information, the second distance information, and the first indication information with reference to the three steps. It is assumed that the first sound box is the central sound box and the M second sound boxes are respectively the secondary box 1, the secondary box 2, the secondary box 3, and the secondary box 4. The following (1) to (3) respectively provide the first distance information, the second distance information, and the first indication information by way of example.

(1) The first distance information indicates that both the secondary box 1 and the secondary box 2 are close to the central sound box, and that both the secondary box 3 and the secondary box 4 are far away from the central sound box. Based on the first distance information, it may be determined that one of the secondary box 1 and the secondary box 2 may be used as the front left sound box, and the other may be used as the front right sound box. One of the secondary box 3 and the secondary box 4 may be used as the rear left sound box, and the other may be used as the rear right sound box.

(2) The second distance information indicates that the secondary box 1 is close to the secondary box 3, and the secondary box 1 is far away from the secondary box 4. Based on the second distance information, it may be determined that the secondary box 1 and the secondary box 3 are located on the same side of the central sound box, and the secondary box 1 and the secondary box 4 are located on the left and right sides of the central sound box.

(3) The first indication information indicates that the secondary box 1 is located on the left side of the central sound box, that is, the secondary box 1 is the front left sound box or the rear left sound box.

Based on the foregoing (1) to (3), the central sound box may determine relative location relationships between the central sound box and the four secondary boxes based on the first distance information, the second distance information, and the first indication information: The secondary box 1 and the secondary box 2 are close to the central sound box, and the secondary box 3 and the secondary box 4 are far away from the central sound box, the secondary box 1 and the secondary box 3 are located on the left side of the central sound box, and the secondary box 2 and the secondary box 4 are located on the right side of the central sound box.

Further, the central sound box may determine the audio channel role information of the central sound box and the four secondary boxes based on the relative location relationships between all sound boxes. For example, the central sound box corresponds to the central audio channel, and the secondary box 1 corresponds to the front left audio channel, the secondary box 2 corresponds to the front right audio channel, the secondary box 3 corresponds to the rear left audio channel, and the secondary box 4 corresponds to the rear left audio channel.

Optionally, with reference to the foregoing (1) to (3), the step S330 may be specifically implemented by using the following Manner 1 or Manner 2.

Manner 1: The first sound box determines a first topological relationship between the first sound box and the M second sound boxes based on the first distance information and the second distance information, and determines the audio channel role information of the first sound box and the M second sound boxes based on the first topological relationship and the first indication information.

For example, the central sound box may determine the first topological relationship based on the first distance information and the second distance information: The secondary box 1 and the secondary box 2 are close to the central sound box, and the secondary box 3 and the secondary box 4 are far away from the central sound box. In addition, the secondary box 1 and the secondary box 3 are located on the same side of the central sound box, and the secondary box 1 and the secondary box 4 are respectively located on two sides of the central sound box. On this basis, if the central sound box receives the first indication information input by the user at this time (for example, indicating that the secondary box 1 is located on the left side of the central sound box), the central sound box may determine, based on the first topological relationship and the first indication information, that the secondary box 1 and the secondary box 2 are close to the central sound box, and that the secondary box 3 and the secondary box 4 are far away from the central sound box. The secondary box 1 and the secondary box 3 are both located on the left side of the central sound box, and the secondary box 2 and the secondary box 4 are both located on the right side of the central sound box. Further, the central sound box may determine that the audio channel role information of the central sound box and the secondary box 1 to the secondary box 4 are respectively the central audio channel, the front left audio channel, the front right audio channel, the rear left audio channel, and the rear right audio channel.

Manner 2: The first sound box determines a second topological relationship between the first sound box and the M second sound boxes based on the first distance information and the first indication information, and determines the audio channel role information of the first sound box and the M second sound boxes based on the second topological relationship and the second distance information.

For example, after the central sound box obtains the first distance information (for example, the secondary box 1 and the secondary box 2 are close to the central sound box, and the secondary box 3 and the secondary box 4 are far away from the central sound box), if the central sound box receives the first indication information input by the user (for example, indicating that the secondary box 1 is located on the left side of the central sound box), the central sound box may determine the second topological relationship based on the first distance information and the first indication information: The secondary box 1 and the secondary box 2 are close to the central sound box, and the secondary box 3 and the secondary box 4 are far away from the central sound box. The secondary box 1 is located on the left side of the central sound box. On this basis, the central sound box determines, based on the second topological relationship and the second distance information (for example, the secondary box 1 and the secondary box 3 are located on the same side of the central sound box, and the secondary box 1 and the secondary box 4 are respectively located on both sides of the central sound box), that the secondary box 1 and the secondary box 2 are close to the central sound box, the secondary box 3 and the secondary box 4 are far away from the central sound box, both the secondary box 1 and the secondary box 3 are located on the left side of the central sound box, and both the secondary box 2 and the secondary box 4 are located on the right side of the central sound box. Further, the central sound box may determine that the audio channel role information of the central sound box and the secondary box 1 to the secondary box 4 are respectively the central audio channel, the front left audio channel, the front right audio channel, the rear left audio channel, and the rear right audio channel.

It can be learned that, according to the method provided in this embodiment of this application, sound boxes may form a stereo sound box system without a need to preconfigure audio channel roles before delivery. To be specific, the sound boxes may not form the stereo sound box system but are used as a single sound box. Alternatively, the sound boxes may form the stereo sound box system and be used as a sound box of any audio channel role. This can improve flexibility of using the sound boxes. Certainly, when the sound boxes form the stereo sound box system, the user may complete audio channel configuration without using an additional device (a dedicated application needs to be installed for audio channel configuration). This may improve audio channel configuration efficiency.

It should be noted that the foregoing uses an example in which an execution body is the central sound box to describe the solution provided in this embodiment of this application. Certainly, the execution body may also be a mobile phone. When the execution body is the central sound box, the central sound box obtains the first distance information, the second distance information, and the first indication information, and determines the audio channel role information of the first sound box and the M second sound boxes based on the first distance information, the second distance information, and the first indication information. Different from that, when the execution body is a mobile phone that establishes a wireless connection to the central sound box, the central sound box may obtain the first distance information, the second distance information, and the first indication information, and send the obtained information to the mobile phone. After obtaining the information, the mobile phone may determine the audio channel role information of the first sound box and the M second sound boxes based on the information.

According to the method for determining an audio channel role of a sound box provided in this embodiment of this application, a plurality of independent sound boxes (including the first sound box and the M second sound boxes) whose audio channel roles are not preconfigured can be freely placed based on a conventional layout of a stereo sound box system, without being limited to the audio channel role information of the sound boxes, in this embodiment of this application. Relative locations of the plurality of sound boxes can be accurately determined, in combination with first indication information used to indicate relative locations of one second sound box and the first sound box, by determining relative locations of the first sound box and the M second sound boxes and relative locations of the M second sound boxes. Then, audio channel role information of the plurality of sound boxes can be accurately and quickly determined. In this way, the plurality of independent sound boxes can form the stereo sound box system, and a stereo effect can be generated when audio signals are played by using the plurality of sound boxes. In this way, these independent sound boxes that have no audio channel role information can be flexibly combined, and the audio channel roles of all the sound boxes can be configured, to form the stereo sound box system. Therefore, in this embodiment of this application, an audio channel configuration operation of the stereo sound box system including the plurality of sound boxes can be simplified, and factory setting of the audio channel role of the sound box is not required. This improves flexibility of using the sound boxes.

Figure 7:
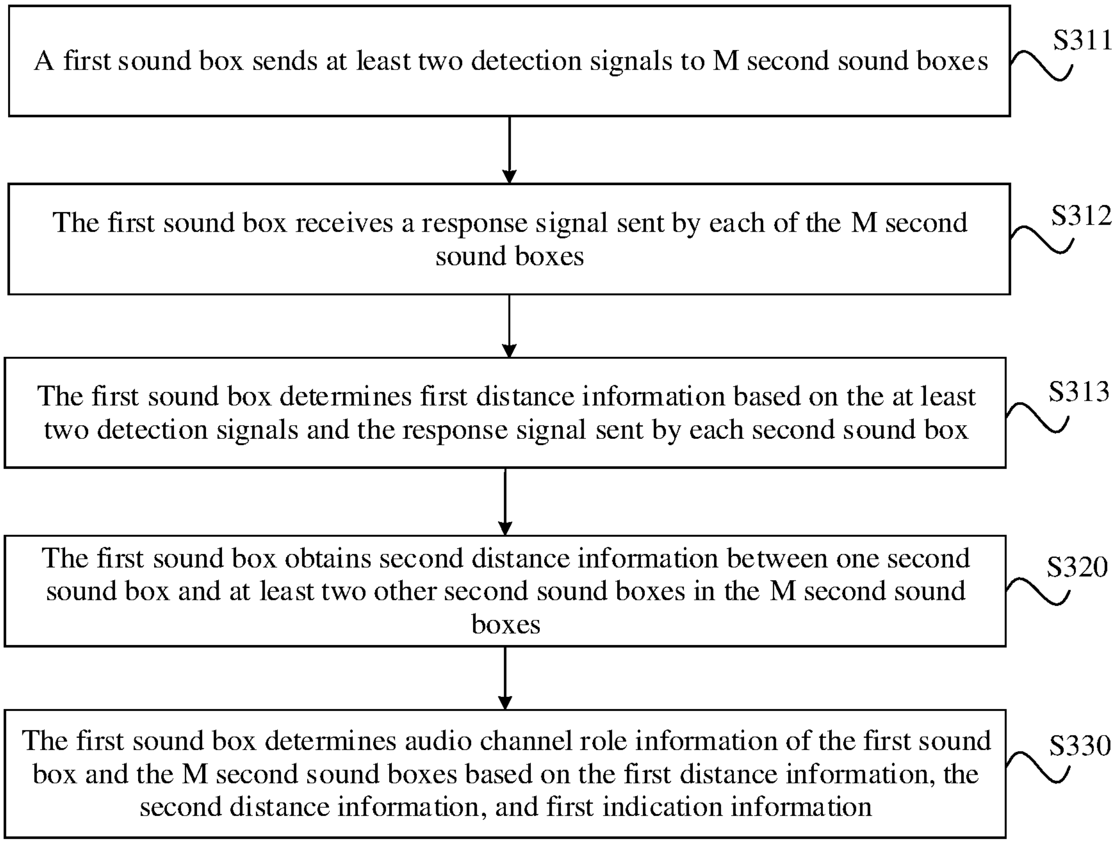
FIG. 7 is a second schematic flowchart of a method for determining an audio channel role of a sound box according to an embodiment of this application.

In this embodiment of this application, a lower transmit power of the radio signal (for example, the Wi-Fi signal) indicates a shorter perception distance or a smaller perception distance range of the radio signal, and a higher transmit power of the radio signal indicates a longer perception distance or a larger perception distance range of the radio signal. Therefore, in this embodiment of this application, radio signals may be sent by using different transmit powers to perceive the distances between the first sound box and the M second sound boxes. Refer to FIG. 6A. It is assumed that a detection signal is sent at a low transmit power. In this case, a coverage area of the detection signal is small, and the secondary box 1 and the secondary box 2 are located within the coverage area of the detection signal. In this way, it may be determined that both the secondary box 1 and the secondary box 2 are close to the central sound box 10. It is assumed that a detection signal is sent at a high transmit power. In this case, a coverage area of the detection signal becomes larger, and the secondary box 1, the secondary box 2, the secondary box 3, and the secondary box 4 are all located within the coverage area of the detection signal. Both the secondary box 3 and the secondary box 4 are far away from the central sound box 10. For example, with reference to FIG. 3, as shown in FIG. 7, obtaining the first distance information between the first sound box and the M second sound boxes (the step S310) may be specifically implemented by using the following steps S311 to S313.

S311: The first sound box sends at least two detection signals to the M second sound boxes.

The at least two detection signals are signals sent by the first sound box at at least two different moments by using different transmit powers, and the at least two detection signals are in a one-to-one correspondence with the at least two different moments. For example, the first sound box may send or broadcast the detection signals at intervals of preset duration, and transmit powers are different.

S312: The first sound box receives a response signal sent by each of the M second sound boxes.

The response signal includes a response signal responding to one of the at least two detection signals. The response signal sent by each second sound box includes an identifier of each second sound box. The identifier of each second sound box is used to uniquely indicate each second sound box. Optionally, the identifier may include elements such as a word, a number, a symbol, or a pattern, or a combination of the elements. For example, it is assumed that M=4. For the four secondary boxes, an identifier of the secondary box 1 is 1, an identifier of the secondary box 2 is 2, an identifier of the secondary box 3 is 3, and an identifier of the secondary box 4 is 4.

For example, it is assumed that the first sound box sends a first detection signal at a first transmit power. If the secondary box 1 receives the first detection signal, the secondary box 1 sends a first response signal to the first sound box in response to the first detection signal. The first response signal includes the identifier of the secondary box 1. In addition, the first sound box sends a second detection signal at a second transmit power, and the secondary box 3 receives the second detection signal. In this case, the secondary box 1 sends a second response signal to the first sound box in response to the second detection signal. The second response signal includes the identifier of the secondary box 3. The first detection signal may be the same as or different from the second detection signal.

S313: The first sound box determines the first distance information based on the at least two detection signals and the response signal sent by each second sound box.

Optionally, the first sound box may determine the first distance information in the following two manners.

Manner 1: The first sound box broadcasts the radio signal, gradually increases a transmit power, receives the response signal sent by each second sound box, and determines, based on the response signal, a distance (for example, distance perceived from near to far) between the first sound box and each second sound box.

Specifically, the first sound box first sends the signal at the low transmit power, and correspondingly receives (that is, perceives) the response signal. The first sound box increases the transmit power after preset duration, and correspondingly receives (that is, perceives) the response signal. Further, the first sound box may determine distances between the first sound box and the M second sound boxes based on the low transmit power corresponding to a short perception distance or a small perception range, and the high transmit power corresponding to a long perception distance or a large perception range.

Figure 8A:
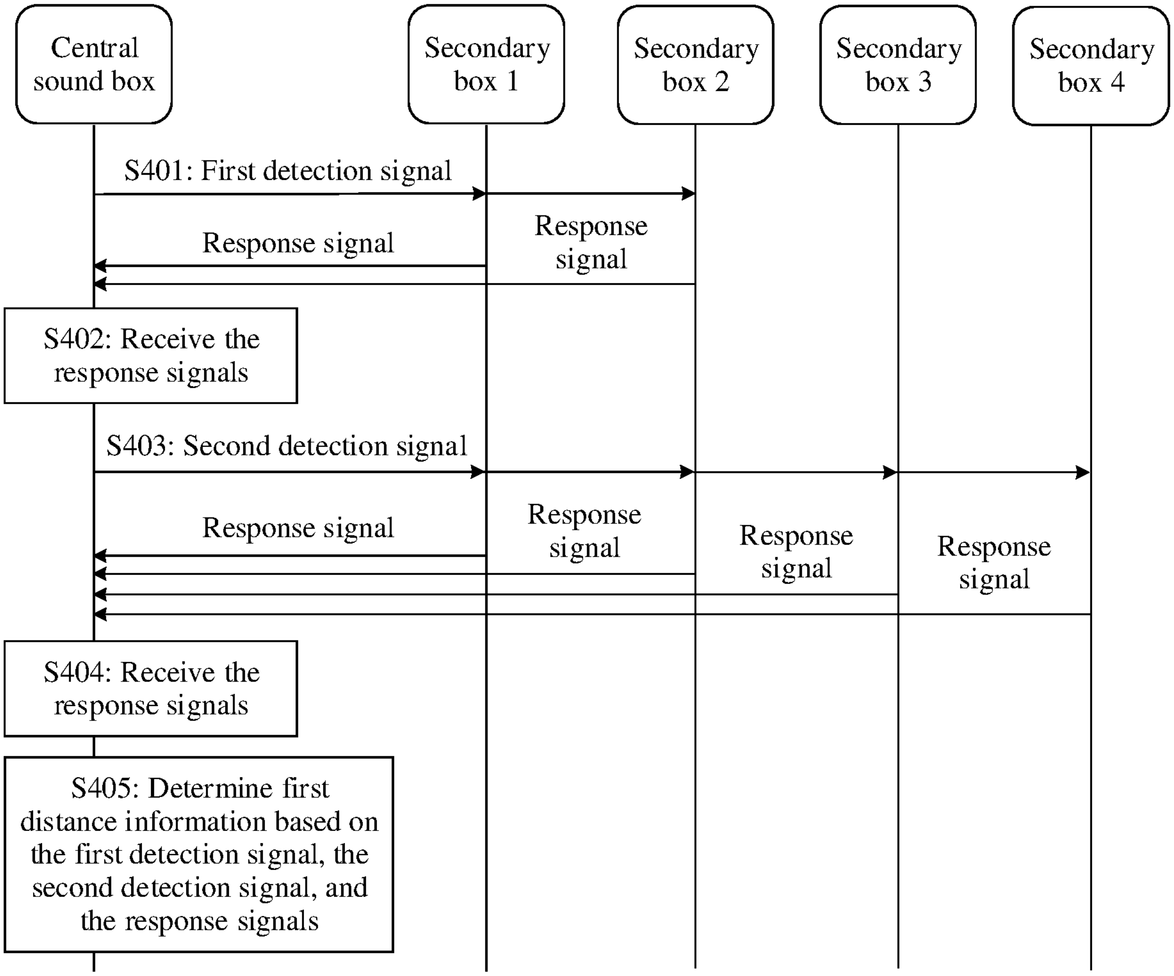
FIG. 8A is a third schematic flowchart of a method for determining an audio channel role of a sound box according to an embodiment of this application.

For example, FIG. 8A is a schematic flowchart of a method of how the central sound box interacts with another sound box and determines the first distance information. As shown in FIG. 8A, the method procedure includes the following steps S401 to S405.

S401: The central sound box broadcasts the first detection signal by using a low power.

The central sound box first sends the radio signal as the first detection signal by using the low transmit power. Because a transmission distance of the first detection signal is short, that is, a perception distance is short or a perception distance range is small, the secondary box 1 and the secondary box 2 that are close to the central sound box may receive the first detection signal. Correspondingly, the secondary box 1 and the secondary box 2 send response signals to the central sound box.

S402: The central sound box receives the response signal sent by the secondary box 1 and the response signal sent by the secondary box 2.

The central sound box receives the response signal sent by the secondary box 1 in response to the first detection signal and the response signal sent by the secondary box 2 in response to the first detection signal. Because a transmit power is low and a perception distance is short, the central sound box perceives only a part of the secondary boxes within a close range: the secondary box 1 and the secondary box 2.

S403: The central sound box broadcasts the second detection signal by using a high power.

The central sound box sends the radio signal as the second detection signal by using the high transmit power. Because a transmission distance of the second detection signal is long, that is, a perception distance is long or a perception distance range is large, the secondary box 1 and the secondary box 2 that are close to the central sound box may receive the second detection signal, and the secondary box 3 and the secondary box 4 that are far away from the central sound box may also receive the second detection signal. Correspondingly, the secondary box 1, the secondary box 2, the secondary box 3, and the secondary box 4 send response signals to the central sound box.

S404: The central sound box receives the response signal sent by the secondary box 1, the response signal sent by the secondary box 2, the response signal sent by the secondary box 3, and the response signal sent by the secondary box 4.

The central sound box may receive the response signal sent by the secondary box 1 in response to the second detection signal, the response signal sent by the secondary box 2 in response to the second detection signal, the response signal sent by the secondary box 3 in response to the second detection signal, and the response signal sent by the secondary box 4 in response to the second detection signal. Because the transmit power and the perception distance increases, the central sound box may perceive all four surrounding secondary boxes: the secondary box 1, the secondary box 2, the secondary box 3, and the secondary box 4.

S405: The central sound box determines the first distance information based on the first detection signal, the second detection signal, and the received response signals.

The low transmit power corresponds to the short perception distance or the small perception range, and the high transmit power corresponds to the long perception distance or the large perception range. In this case, the central sound box may gradually increase the transmit power and broadcast the detection signals, to gradually increase the perception distance. Specifically, the central sound box may determine, based on the first detection signal and the received response signals respectively sent by the secondary box 1 and the secondary box 2 in response to the first detection signal, that the secondary box 1 and the secondary box 2 are close to the central sound box. Then, the central sound box may determine, based on the second detection signal and the received response signals sent by the four secondary boxes in response to the second detection signal, that the secondary box 3 and the secondary box 4 are far away from the central sound box. Therefore, the first distance information between the central sound box and the four secondary boxes may be determined.

In this embodiment of this application, in a manner of gradually increasing the transmit power, all sound boxes may be sequentially detected from near to far. In this way, distance relationships between all sound boxes may be more accurately determined.

Manner 2: The first sound box broadcasts the radio signal, gradually reduces a transmit power, receives the response signal sent by each second sound box, and determines, based on the response signal, a distance (for example, distance perceived from far to near) between the first sound box and each second sound box.

Specifically, the first sound box first sends the signal at a high transmit power, and correspondingly receives (that is, perceives) the response signal. The first sound box reduces the transmit power after preset duration, and correspondingly receives (that is, perceives) the response signal. Further, the first sound box may determine distances between the first sound box and the M second sound boxes based on the low transmit power corresponding to a short perception distance or a small perception range, and the high transmit power corresponding to a long perception distance or a large perception range.

Figure 8B:
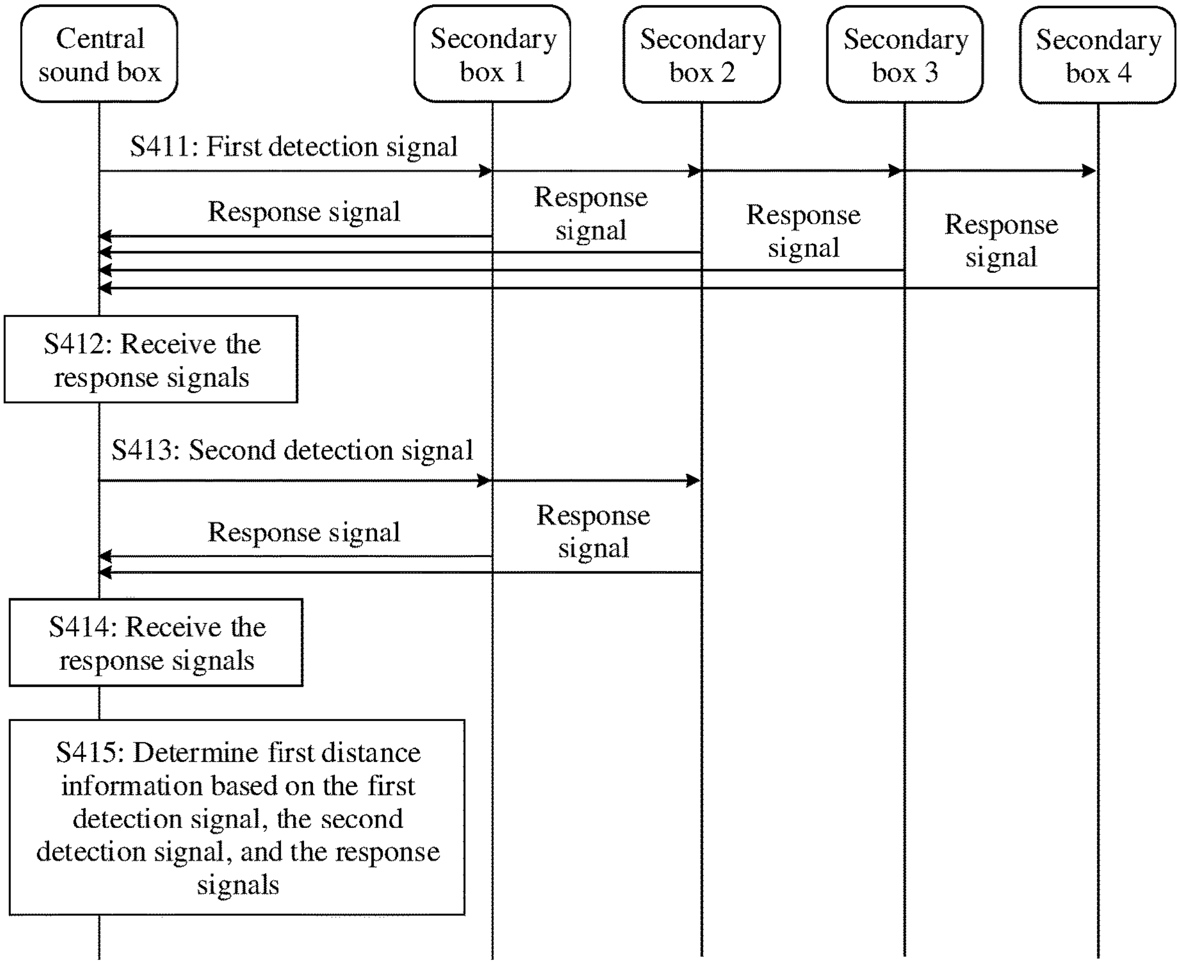
FIG. 8B is a fourth schematic flowchart of a method for determining an audio channel role of a sound box according to an embodiment of this application.

For example, FIG. 8B is a schematic flowchart of another method of how the central sound box interacts with another sound box and determines the first distance information. As shown in FIG. 8B, the method procedure includes the following steps S411 to S415.

S411: The central sound box broadcasts the first detection signal by using a high power.

The central sound box first sends the radio signal as the first detection signal by using the high transmit power. Because a transmission distance of the first detection signal is long, that is, a perception distance is long or a perception distance range is large, the secondary box 1, the secondary box 2, the secondary box 3, and the secondary box 4 that are close to the central sound box may receive the first detection signal. Correspondingly, the secondary box 1, the secondary box 2, the secondary box 3, and the secondary box 4 send response signals to the central sound box.

S412: The central sound box receives the response signals that are respectively sent by the secondary box 1, the secondary box 2, the secondary box 3, and the secondary box 4 in response to the first detection signal.

Because the transmit power is high and the perception distance is large, the central sound box may perceive all four surrounding secondary boxes: the secondary box 1, the secondary box 2, the secondary box 3, and the secondary box 4.

S413: The central sound box broadcasts the second detection signal by using a high power.

The central sound box first sends the radio signal as the second detection signal by using the low transmit power. Because a transmission distance of the second detection signal is short, that is, a perception distance is short or a perception distance range is small, the secondary box 1 and the secondary box 2 that are close to the central sound box may receive the first detection signal. Correspondingly, the secondary box 1 and the secondary box 2 send response signals to the central sound box.

S414: The central sound box receives response signals that are respectively sent by the secondary box 1 and the secondary box 2 in response to the first detection signal.

Because a transmit power becomes lower and a perception distance becomes smaller, the central sound box perceives only a part of the secondary boxes within a close range: the secondary box 1 and the secondary box 2.

S415: The central sound box determines the first distance information based on the first detection signal, the second detection signal, and the received response signals.

The low transmit power corresponds to the short perception distance or the small perception range, and the high transmit power corresponds to the long perception distance or the large perception range. In this case, the central sound box may gradually reduce the transmit power and broadcast the detection signals, to gradually reduce the perception distance. Specifically, the central sound box may determine, based on the first detection signal and the received response signals respectively sent by the four secondary boxes in response to the first detection signal, that the four secondary boxes are respectively the secondary box 1, the secondary box 2, the secondary box 3, and the secondary box 4. The central sound box may determine, based on the second detection signal and the received response signals respectively sent by the secondary box 1 and the secondary box 2 in response to the second detection signal, that the secondary box 1 and the secondary box 2 are close to the central sound box. Then, the central sound box may determine that the secondary box 3 and the secondary box 4 are far away from the central sound box. Therefore, the first distance information between the central sound box and the four secondary boxes may be determined.

For example, the central sound box first sends the radio signal as a third detection signal by using the high transmit power, and the central sound box receives a response signal sent by the secondary box 1 in response to the third detection signal, a response signal sent by the secondary box 2 in response to the third detection signal, a response signal sent by the secondary box 3 in response to the third detection signal, and a response signal sent by the secondary box 4 in response to the third detection signal. Then the central sound box sends the radio signal as a fourth detection signal by using the low transmit power, and the central sound box receives a response signal sent by the secondary box 1 in response to the fourth detection signal and a response signal sent by the secondary box 2 in response to the fourth detection signal. In this case, because the low transmit power corresponds to the short perception distance or the small perception range, and the high transmit power corresponds to the long perception distance or the large perception range, the central sound box may, based on the third detection signal, the fourth detection signal, and the response signal sent by each second sound box, determine that the secondary box 1 and the secondary box 2 are close to the central sound box, and the secondary box 3 and the secondary box 4 are far away from the central sound box.

In this embodiment of this application, in a manner of gradually reducing the transmit power, all sound boxes may be sequentially detected from far to near. In this way, distance relationships between all sound boxes may be more accurately determined.

In the foregoing descriptions, the first sound box determines the distances between the first sound box and the M second sound boxes based on the at least two detection signals and the response signal sent by each second sound box. Certainly, the first sound box may further determine specific distance values between the first sound box and the M second sound boxes, which is described in detail below.

In this embodiment of this application, the first sound box may determine the first distance information (for example, the distance value) based on a first correspondence, the at least two detection signals, and the response signal sent by each second sound box. The first correspondence is used to indicate that different transmit powers of the first sound box correspond to the response signals sent by the M second sound boxes at different distances from the first sound box. Alternatively, it may be understood that different transmit powers correspond to different distance values. As shown in Table 1, as the transmit powers increase, the corresponding distance value also increases. The first correspondence may be pre-stored in the first sound box.

It should be noted that the distance value herein corresponds to a maximum distance at which the detection signal arrives. Refer to FIG. 6A again. It is assumed that the detection signal is sent at a transmit power of 6 milliwatts (mW), and the secondary box 1 and the secondary box 2 are located within the coverage area of the detection signal. In this case, the distance value is $R_1$. It is assumed that the detection signal is sent at a transmit power of 20 mW, and the secondary box 1, the secondary box 2, the secondary box 3, and the secondary box 4 are all located within the coverage area of the detection signal. In this case, the distance value is $R_2$.

TABLE 1

| Transmit power | Distance value |
|---|---|
| 2 mW | 10 cm |
| 4 mW | 20 cm |
| 6 mW | 30 cm |
| . . . | . . . |
| 98 mW | 490 cm |
| 100 mW | 500 cm |

Optionally, a specific implementation in which the first sound box determines the distance value based on the first correspondence and the response signal sent by each second sound box may include the following two manners:

Manner 1: The first sound box sends the radio signal and gradually increases the transmit power. It is assumed that a minimum unit of the perception distance is 10 cm (cm), and a corresponding transmit power is 2 mW. The transmit power may be gradually adjusted as 2 mW, 4 mW, 6 mW, and so on. In this way, the first sound box may perceive a distance of 10 cm, 20 cm, 30 cm, and so on. Therefore, the first sound box may determine the specific distance values between the first sound box and the M second sound boxes based on the first correspondence and the response signal sent by each second sound box.

Manner 2: The first sound box sends the radio signal and gradually reduces the transmit power. It is assumed that a maximum unit of the perception distance is 500 cm, and a corresponding transmit power is 100 mW. The transmit power may be gradually adjusted as 100 mW, 98 mW, and so on. In this way, the first sound box can perceive a distance of 500 cm, 490 cm, and so on. Therefore, the first sound box may determine the specific distance values between the first sound box and the M second sound boxes based on the first correspondence and the response signal sent by each second sound box.

In this embodiment of this application, distance relationships between all sound boxes may be more accurately determined by gradually adjusting the transmit power and with reference to a correspondence between the transmit power and the perception distance.

The foregoing describes a possible implementation of how to obtain the first distance information, and the following describes in detail a possible implementation of how to obtain the second distance information.

In a possible implementation, the first sound box may indicate the second sound box in the M second sound boxes to perceive a distance between the second sound box and another second sound box. Then, the second sound box feeds back a perception result (that is, the second distance information) to the first sound box, so that the first sound box may obtain the second distance information.

Figure 9:
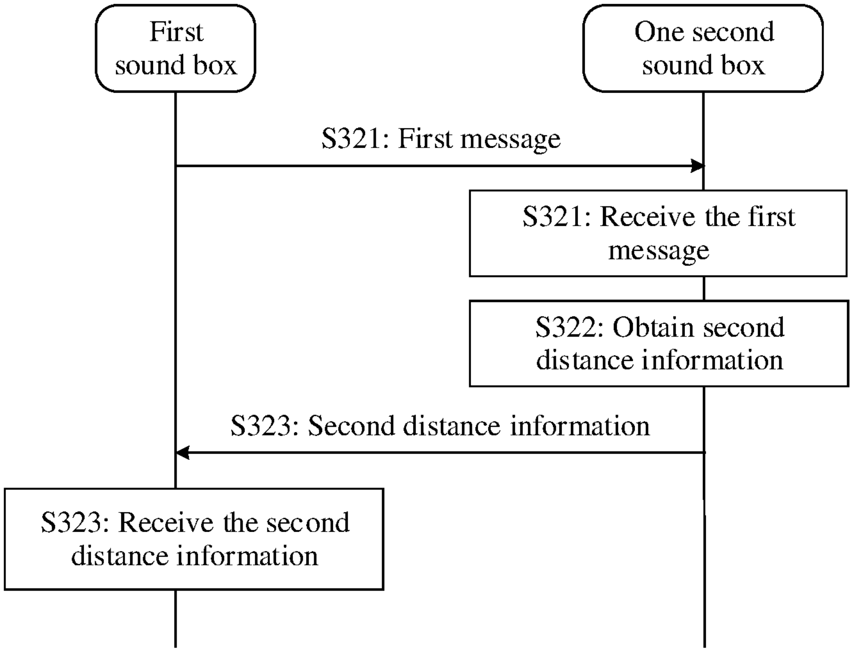
FIG. 9 is a fifth schematic flowchart of a method for determining an audio channel role of a sound box according to an embodiment of this application.

For example, as shown in FIG. 9, obtaining the second distance information between the second sound box and the at least two other second sound boxes in the M second sound boxes (that is, step S32*o*) may be specifically implemented by using the following steps S321 to S323.

S321: The first sound box sends a first message to the second sound box, and the second sound box receives the first message.

The first message is used to indicate the second sound box to obtain the second distance information.

It should be noted that the first sound box may send the first message to a second sound box (for example, a sound box closer to the first sound box) that meets a preset condition and that is in the M second sound boxes, or may send the first message to any second sound box in the M second sound boxes. Specifically, this may be determined based on an actual use requirement, and is not limited in this embodiment of this application.

For example, it is assumed that the central sound box obtains the first distance information: both the secondary box 1 and the secondary box 2 are close to the central sound box, and both the secondary box 3 and the secondary box 4 are far away from the central sound box. In this case, the central sound box may choose to send the first message to the secondary box 1.

S322: The second sound box obtains the second distance information.

In S322, the second sound box obtains the second distance information based on the first message. Because a structure of the second sound box may be the same as that of the first sound box, a process in which the second sound box obtains the second distance information may be similar to a process in which the first sound box obtains the first distance information. For example, the second sound box may use the distance perception technology to calculate the distance between the second sound box and the another second sound box, that is, obtain the second distance information. For example, the distance perception technology may be a manner of perceiving a distance based on a radio signal (for example, a Wi-Fi signal or a Bluetooth signal), or may be a manner of perceiving a distance based on a sound wave signal (for example, an ultrasonic signal), or may be a manner of perceiving a distance based on a light signal (for example, an infrared signal), or may be any other manner of perceiving a distance based on an actual use requirement. Specifically, this may be determined based on the actual use requirement, and is not limited in this embodiment of this application.

In S322, the second sound box may send radio signals by using different transmit powers, to perceive the distance between the second sound box and the another second sound box. For example, the second sound box may periodically send or broadcast the detection signals, and transmit powers are different. For example, the transmit power is gradually adjusted in ascending order, or the transmit power is gradually adjusted in descending order. For a specific implementation of obtaining the second distance information, refer to the detailed description of how to obtain the second distance information in the foregoing steps S311 to S313. Details are not described herein again.

For example, refer to FIG. 5 again. It is assumed that the first sound box is the central sound box 10, and the M second sound boxes are respectively the secondary box 1, the secondary box 2, the secondary box 3, and the secondary box 4. The central sound box 10 sends the first message to a second sound box (for example, the secondary box 1) closer to the central sound box 10. After receiving the first message sent by the central sound box, the secondary box 1 sends the radio signals by using different transmit powers to perceive the distance value between the secondary box 1 and the secondary box 2, the distance value D5 between the secondary box 1 and the secondary box 3, and the distance value D6 between the secondary box 1 and the secondary box 4. Then, the secondary box 1 feeds back these distance values (that is, the second distance information) to the central sound box. Alternatively, after receiving the first message sent by the central sound box, the secondary box 1 sends the radio signals by using different transmit powers to perceive distance relationships between the secondary box 1 and the secondary box 2, the secondary box 3, and the secondary box 4. Then, the secondary box 1 feeds back the distance relationships (that is, the second distance information) to the central sound box.

S323: The second sound box sends the second distance information to the first sound box, and the first sound box receives the second distance information sent by the second sound box.

In the foregoing solution, the first sound box can indicate one second sound box to obtain the second distance information, and obtain the second distance information from the second sound box. In this way, the first sound box can determine relative locations of all the second sound boxes based on the second distance information. This helps determine the relative locations of the first sound box and the M second sound boxes more accurately.

Figure 10:
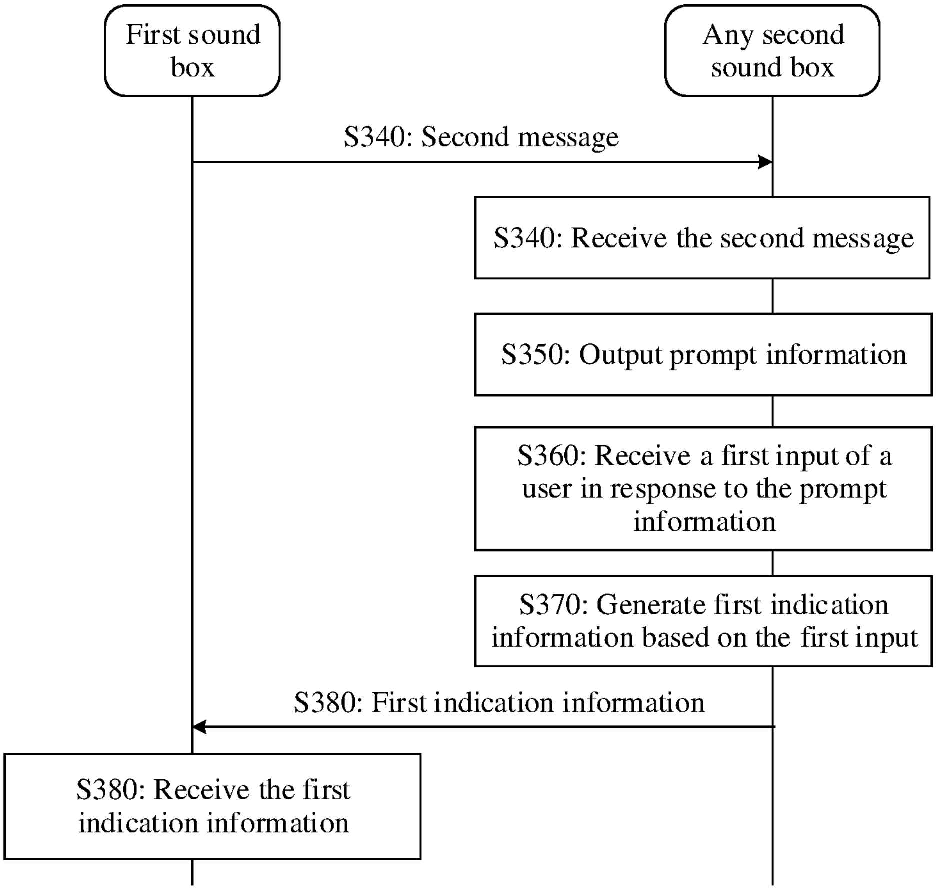
FIG. 10 is a sixth schematic flowchart of a method for determining an audio channel role of a sound box according to an embodiment of this application.

The foregoing describes in detail how to obtain the first distance information and the second distance information, and the following describes in detail a possible implementation of how to obtain the first indication information. Optionally, in this embodiment of this application, as shown in FIG. 10, the method for determining an audio channel role of a sound box provided in this embodiment of this application may further include the following steps S340 to S380.

S340: The first sound box sends the second message to any second sound box in the M second sound boxes, and the any second sound box receives the second message.

In S340, the second message is used to indicate the any second sound box to output prompt information. The prompt information is used to prompt the user to confirm the relative locations of the first sound box and the any second sound box in the M second sound boxes.

S350: The any second sound box outputs the prompt information.

Optionally, the prompt information may be prompt information in a voice form, prompt information in a lighting or blinking form, prompt information in a combination form of voice and lighting, or any other prompt information that meets an actual use requirement (for example, prompt information in a text form or prompt information in a pattern form). Specifically, this may be determined based on the actual use requirement, and is not limited in this embodiment of this application.

For example, the prompt information in the combination form of voice and lighting is used as an example. The prompt information may be: Please confirm whether the currently lit sound box is located on the left side of the central sound box, and answer yes or no. Alternatively, the prompt information may be: Please confirm whether the currently lit sound box is located on the left side of the central sound box. If yes, press a volume "+" key on the currently lit sound box; otherwise, press a volume "−" key.

S360: The any second sound box receives a first input of the user in response to the prompt information.

S370: The any second sound box generates the first indication information based on the first input.

Optionally, the first input may be a touch input (for example, a touch input on a display of the sound box), a press input (for example, a press input on the volume "+" key or the volume "−" key on the sound box), a voice input (for example, "yes" or "no"), or any other input that meets an actual use requirement. Specifically, this may be determined based on the actual use requirement, and is not limited in this embodiment of this application.

S380: The any second sound box sends the first indication information to the first sound box, and the first sound box receives the first indication information sent by the any second sound box.

For example, the first sound box sends the second message to a sound box (for example, the secondary box 1) closer to the first sound box. The second message is used to indicate the secondary box 1 to light on or blink, and output the voice prompt information "Please confirm whether the currently lit sound box is located on the left side of the central sound box". Correspondingly, the user may input the first indication information in response to the voice prompt information, for example, the user may input "Yes" by voice. In this case, the secondary box 1 obtains the first indication information input by the user, and feeds back the first indication information to the first sound box.

Certainly, this embodiment of this application includes but is not limited to the foregoing manners. In actual implementation, the first sound box may indicate the any second sound box in the M second sound boxes to light on. In addition, the first sound box outputs the voice prompt information "Please confirm whether the currently lit sound box is located on the left side of the central sound box." Correspondingly, the user may input the first indication information in response to the voice prompt information, for example, the user may input "Yes" by voice. In this case, the first sound box may directly obtain the first indication information input by the user.

In the foregoing technical solution, the relative locations of the first sound box and the any second sound box in the M second sound boxes are determined based on the first indication information input by the user, so that the relative locations of the first sound box and the M second sound boxes are determined based on the first distance information, the second distance information, and the first indication information. In this way, the audio channel role information of the first sound box and the M second sound boxes can be accurately and quickly determined based on relative locations of all sound boxes.

The following describes in detail how the first sound box and the M second sound boxes play audio based on the audio channel role information to generate a stereo effect after the audio channel role information of the first sound box and the M second sound boxes is determined. Herein, it should be noted that the first sound box establishes a wired connection or a wireless connection to each of the M second sound boxes, and the first sound box establishes a wired connection or a wireless connection to an audio source device. The audio source device is configured to provide an audio signal to the first sound box. After receiving the audio signal, the first sound box may send the audio signal to the M second sound boxes.

Optionally, a possible implementation in which the first sound box and the M second sound boxes play audio based on the audio channel role information to generate the stereo effect includes but is not limited to the following two manners.

Manner 1: After the audio channel role information of the first sound box and the M second sound boxes is determined, the first sound box receives a first audio signal sent by the audio source device. The first audio signal includes an audio signal corresponding to audio channel role information of each of the M second sound boxes. The first sound box sends, to each second sound box, an audio signal that is in the first audio signal and that corresponds to the audio channel role information of each second sound box.

For example, it is assumed that the audio channel role information of the central sound box and the secondary box 1 to the secondary box 4 is determined as the central audio channel, the front left audio channel, the front right audio channel, the rear left audio channel, and the rear right audio channel, respectively. The first audio signal includes an audio signal of the central audio channel, an audio signal of the front left audio channel, an audio signal of the front right audio channel, an audio signal of the rear left audio channel, and an audio signal of the rear right audio channel. In this case, the first sound box may send an audio signal corresponding to the audio channel role information of the sound box to each second sound box. Correspondingly, the secondary box 1 receives and plays the audio signal of the front left audio channel, the secondary box 2 receives and plays the audio signal of the front right audio channel, the secondary box 3 receives and plays the audio signal of the rear left audio channel, and the secondary box 4 receives and plays the audio signal of the rear right audio channel. In addition, the central sound box is responsible for playing the audio signal of the central audio channel. Therefore, a stereo effect of audio may be implemented through cooperation of the central sound box and all secondary boxes.

Manner 2: After the audio channel role information of the first sound box and the M second sound boxes is determined, the first sound box sends, to each second sound box, audio channel role information corresponding to each of the M second sound boxes. After receiving the corresponding audio channel role information, each second sound box stores the audio channel role information. When the first sound box receives a second audio signal sent by the audio source device, the first sound box may send the second audio signal to each of the M second sound boxes. After receiving the second audio signal, each second sound box plays the second audio signal based on the audio channel role information corresponding to each second audio signal.

For example, the secondary box 1 in the M second sound boxes is used as an example. If the secondary box 1 stores audio channel role information of the secondary box 1 as the front left audio channel, after receiving the second audio signal, the secondary box 1 plays the second audio signal in a playing manner corresponding to the front left audio channel.

It should be noted that a difference between Manner 1 and Manner 2 lies in that, in Manner 1, the first sound box sends audio signals of corresponding audio channels to the M second sound boxes respectively, and each second sound box directly plays the audio signals of the corresponding audio channels. However, in Manner 2, the first sound box separately sends a same audio signal to the M second sound boxes, and each second sound box plays the audio signal based on the sound box role information of the second sound box respectively.

Figure 11A:
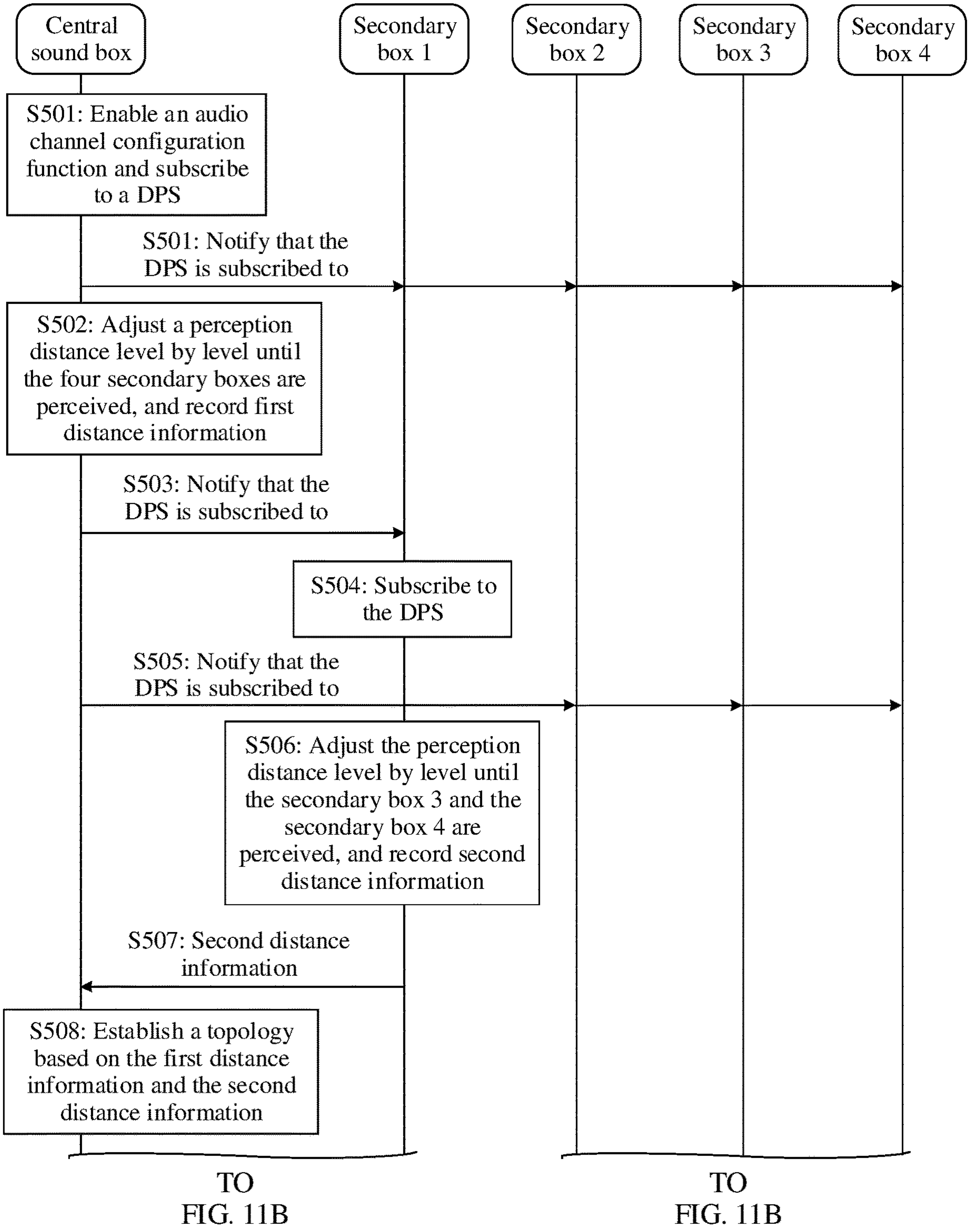
FIG. 11A and FIG. 11B are a seventh schematic flowchart of a method for determining an audio channel role of a sound box according to an embodiment of this application.
Figure 11B:
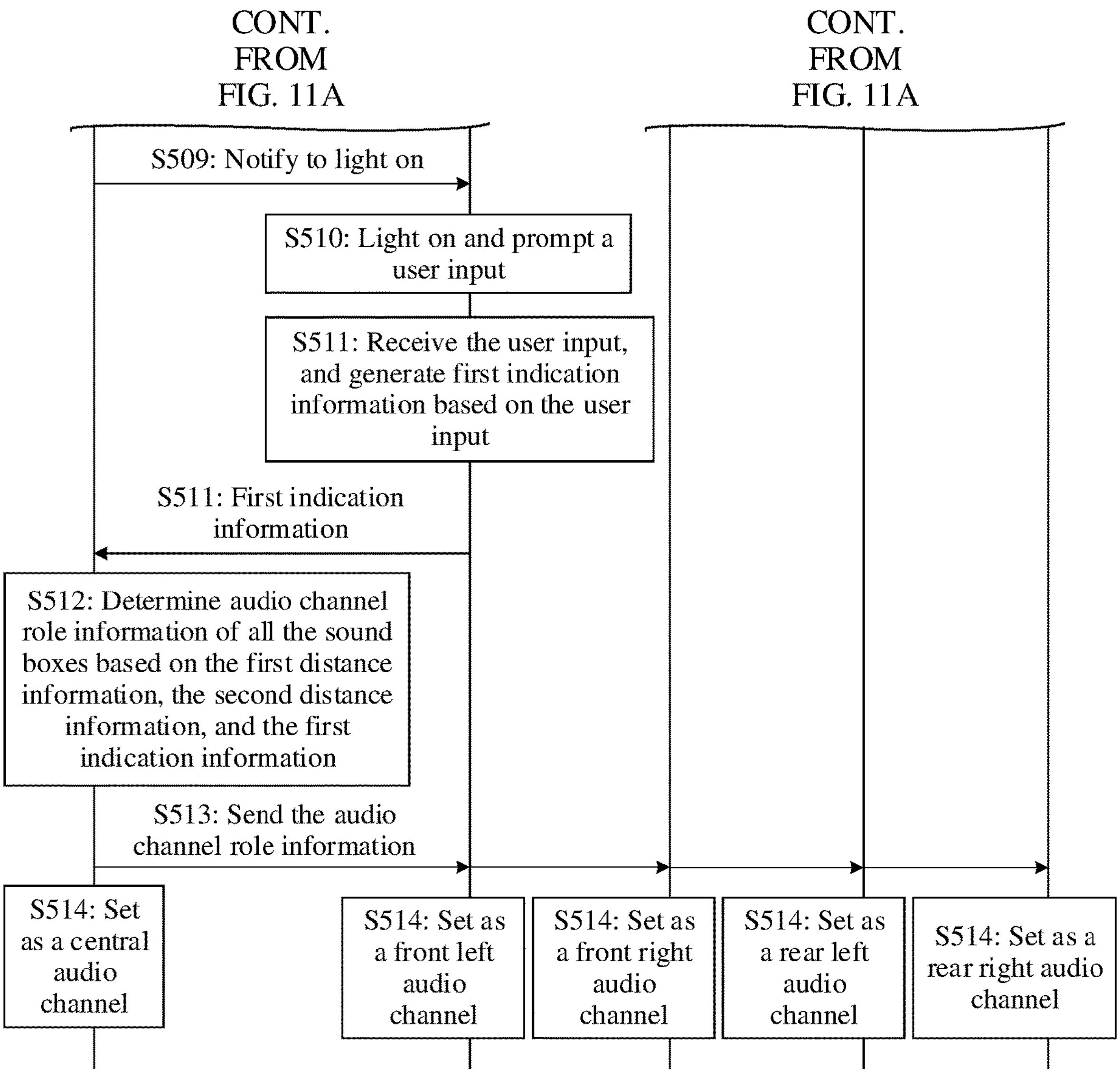

The following describes, by way of example, possible implementations of the audio channel role determining method provided in embodiments of this application with reference to accompanying drawings. For example, FIG. 11A and FIG. 11B are a schematic flowchart of a method for how the central sound box interacts with the four secondary boxes and determines an audio channel role of each sound box. The method procedure may include the following steps S501 to S514.

S501: In response to an input of the user, the central sound box enables an audio channel configuration function, subscribes to a DPS, and notifies the four secondary boxes that the DPS is subscribed to.

The user triggers the audio channel configuration function to be enabled by performing an input (for example, pressing a key) on the central sound box. The central sound box subscribes to the distance perception service (distance perception service, DPS). The DPS may be an application that can implement distance perception, that is, adjust a perception distance by adjusting a transmit power of an antenna level by level. The central sound box notifies all secondary boxes (the secondary box 1, the secondary box 2, the secondary box 3, and the secondary box 4), connected to the central sound box, that the DPS is subscribed to. All secondary boxes support the DPS distance perception service when receiving the notification. In this way, the central sound box that subscribes to the DPS may perceive a distance relationship between the central sound box and all secondary boxes through the DPS application.

S502: The central sound box adjusts the perception distance level by level until the four secondary boxes are perceived, and records the first distance information.

The central sound box perceives and records the first distance information by adjusting a transmit power of a single Wi-Fi antenna. For example, the first distance information includes a distance between the central sound box and the secondary box 1, a distance between the central sound box and the secondary box 2, a distance between the central sound box and the secondary box 3, and a distance between the central sound box and the secondary box 4.

S503: The central sound box notifies the secondary box 1 to subscribe to the DPS.

S504: The secondary box subscribes to the DPS.

S505: The central sound box notifies the secondary box 2, the secondary box 3, and the secondary box 4 that the DPS is subscribed to.

The central sound box selects the secondary box 1 that is close to the central sound box, and notifies the secondary box 1 that the DPS is subscribed to. Further, the secondary box 1 subscribes to the DPS, and the secondary box 2, the secondary box 3, and the secondary box 4 receive DPS release notifications of the central sound box, and support the DPS distance perception service.

S506: The secondary box 1 adjusts the perception distance level by level until the secondary box 3 and the secondary box 4 are perceived, and records the second distance information.

S507: The secondary box 1 sends the second distance information to the central sound box.

The secondary box 1 perceives and records the second distance information by adjusting the transmit power of the single Wi-Fi antenna in the manner described in step S502. For example, the second distance information includes a distance between the secondary box 1 and the secondary box 2, a distance between the secondary box 1 and the secondary box 3, and a distance between the secondary box 1 and the secondary box 4. Then, the secondary box 1 may report the recorded second distance information to the central sound box.

S508: The central sound box receives the second distance information, and establishes a sound box location topology based on the first distance information and the second distance information.

For example, in the sound box location topology established by the central sound box, both the secondary box 1 and the secondary box 2 are close to the central sound box, and both the secondary box 3 and the secondary box 4 are far away from the central sound box. The secondary box 1 and the secondary box 3 are located on one side of the central sound box, and the secondary box 2 and the secondary box 4 are located on the other side of the central sound box. However, in this case, whether the secondary box 1 and the secondary box 3 are both located on the left side or the right side of the central sound box, or whether the secondary box 2 and the secondary box 4 are both located on the left side or the right side of the central sound box is not determined. Therefore, if a relative location (left or right) of any secondary box in the four secondary boxes relative to the central sound box is determined, whether other secondary boxes are located on the left or right of the central sound box may be correspondingly determined.

S509: The central sound box indicates the secondary box 1 to light on or blink.

S510: The secondary box flights on or blinks, to prompt a user input.

S511: The secondary box 1 receives the user input, generates the first indication information based on the user input, and sends the first indication information to the central sound box.

The central sound box may select, based on the recorded first distance information, the secondary box 1 that is close to the central sound box, and indicate the secondary box 1 to light on and prompt (or prompt by voice) the user to input the first indication information. For example, the user may press a volume key (+/−) to determine whether the sound box is placed on the left or right side of the central sound box. For example, the volume key "+" indicates the left side, and the volume key "−" indicates the right side.

For example, the secondary box 1 receives an operation of pressing the volume key "+" on the secondary box 1 by the user, and generates the first indication information. The first indication information indicates that the secondary box 1 is located on the left side of the central sound box. Further, the secondary box 1 reports the first indication information to the central sound box.

S512: The central sound box determines audio channel role information of all sound boxes based on the first distance information, the second distance information, and the first indication information.

S513: The central sound box sends, to each secondary box, audio channel role information corresponding to each secondary box.

For example, it is determined, based on the first distance information and the second distance information, that both the secondary box 1 and the secondary box 2 are close to the central sound box, both the secondary box 3 and the secondary box 4 are far away from the central sound box, both the secondary box 1 and the secondary box 3 are located on one side of the central sound box, and both the secondary box 2 and the secondary box 4 are located on the other side of the central sound box. In this case, it may be further determined, based on the first indication information, that both the secondary box 1 and the secondary box 3 are located on the left side of the central sound box, and both the secondary box 2 and the secondary box 4 are located on the right side of the central sound box.

Further, after determining relative location relationships of all sound boxes, the central sound box may determine the audio channel role information of all sound boxes based on the relative location relationships of all sound boxes, and send corresponding audio channel role information to all sound boxes. For example, the audio channel role information of the central sound box and the secondary box 1 to the secondary box 4 are respectively the central audio channel, the front left audio channel, the front right audio channel, the rear left audio channel, and the rear right audio channel.

S514: The central sound box is set as the central audio channel, the secondary box 1 is set as the front left audio channel, the secondary box 2 is set as the front right audio channel, the secondary box 3 is set as the rear left audio channel, and the secondary box 4 is set as the rear right audio channel.

Figure 12:
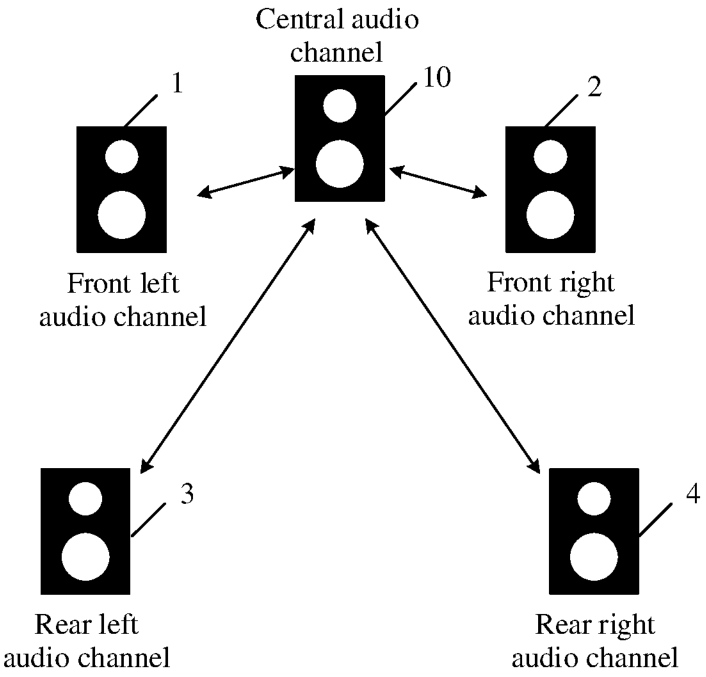
FIG. 12 is a schematic diagram of completing audio channel role configuration in a 5-channel multi-sound box system by using a method for determining an audio channel role of a sound box according to an embodiment of this application.

FIG. 12 is a schematic diagram of completing audio channel role configuration in a 5-channel multi-sound box system. FIG. 12 shows relative location relationships and audio channel roles of the central sound box 10 and the four secondary boxes.

In the foregoing solution, there are a plurality of independent sound boxes whose audio channel role is not preconfigured. After the audio channel role information corresponding to all sound boxes is determined, audio signals of corresponding audio channels are separately played by the sound boxes corresponding to the sound box role information. In this way, the plurality of independent sound boxes may form a stereo sound box system, and a stereo effect can be generated when the audio signals are played through the plurality of sound boxes. It can be learned that, according to the method provided in this embodiment of this application, sound boxes may form the stereo sound box system without a need to preconfigure audio channel roles before delivery. To be specific, the sound boxes may not form the stereo sound box system but are used as a single sound box. Alternatively, the sound boxes may form the stereo sound box system and be used as a sound box of any audio channel role. This can improve flexibility of using the sound boxes. Certainly, when the sound boxes form the stereo sound box system, the user may complete audio channel configuration without using an additional electronic device or an additional audio channel configuration APP. This may improve audio channel configuration efficiency.

In this way, according to the method for determining an audio channel role of a sound box provided in this embodiment of this application, when the sound boxes form the stereo sound box system, audio channel roles of all sound boxes do not need to be set one by one. After the user triggers the sound box to enable the audio channel configuration function, the audio channel roles of all sound boxes may be automatically determined and the audio channel role configuration can be completed, to make an operation of forming the plurality of sound boxes into the stereo sound box system more convenient.

Figure 13:
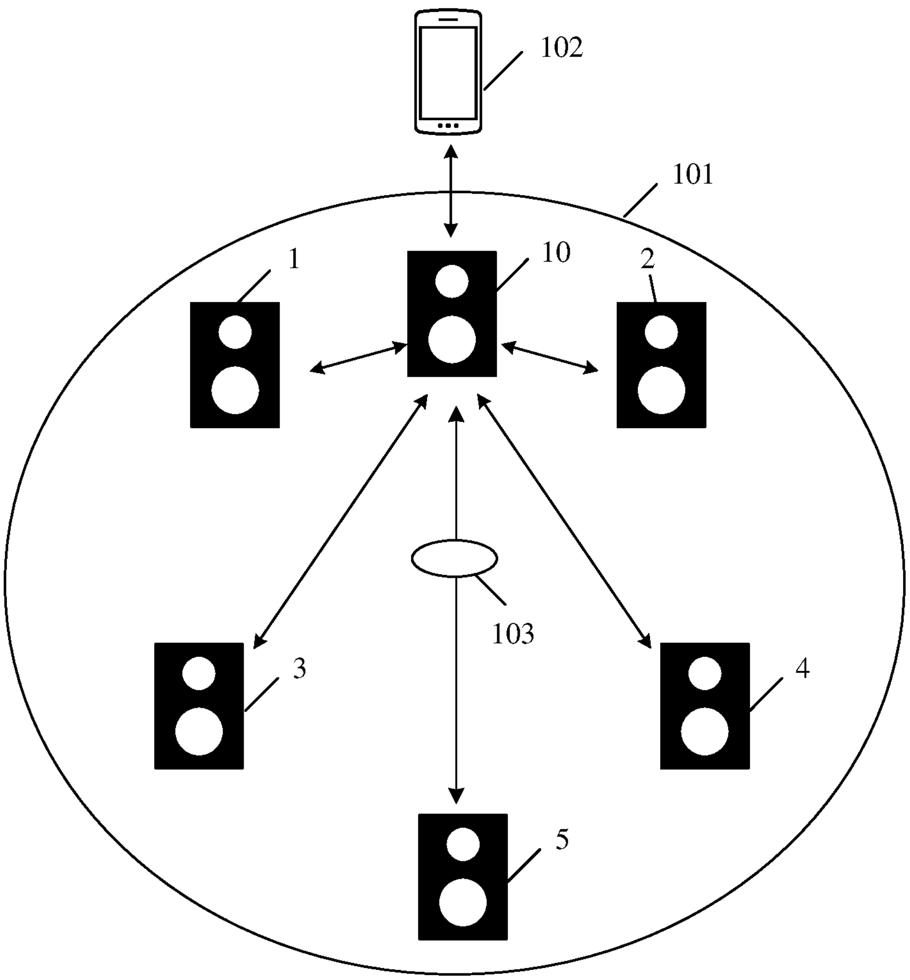
FIG. 13 is a schematic diagram of an architecture of another stereo sound box system according to an embodiment of this application.

The foregoing is described by using an example in which the method for determining an audio channel role of a sound box provided in this application is applied to a scenario in which five sound boxes form a stereo sound box system. Certainly, the method for determining an audio channel role of a sound box provided in this embodiment of this application is also applicable to a scenario in which more sound boxes form a stereo sound box system. For example, as shown in FIG. 13, six independent sound boxes (the central sound box 10 and the secondary box 1 to the secondary box 5) may be placed according to the location shown in the figure, and then the following steps are performed.

(1) The central sound box 10 may obtain first distance information between the central sound box 10 and the five secondary boxes. For example, the first distance information indicates that both the secondary box 1 and the secondary box 2 are close to the central sound box, both the secondary box 3 and the secondary box 4 are far away from the central sound box, and the secondary box 5 is farthest away from the central sound box. Based on the first distance information, it may be determined that one of the secondary box 1 and the secondary box 2 may be used as the front left sound box, and the other is the front right sound box. One of the secondary box 3 and the secondary box 4 may be used as a central left sound box, the other is a central right sound box, and the secondary box 5 may be used as the rear sound box.

(2) The central sound box 10 obtains second distance information between one secondary box (for example, the secondary box 1) and at least two other secondary boxes (for example, the secondary box 3 and the secondary box 4) in the five secondary boxes. For example, the second distance information indicates that the secondary box 1 is close to the secondary box 3, and the secondary box 1 is far away from the secondary box 4. Based on the second distance information, it may be determined that the secondary box 1 and the secondary box 3 are located on the same side of the central sound box, and the secondary box 1 and the secondary box 4 are located on the left and right sides of the central sound box.

(3) The central sound box 10 obtains first indication information that is used to indicate relative locations of the central sound box 10 and one of the five secondary boxes (for example, the secondary box 1). For example, the first indication information indicates that the secondary box 1 is located on the left side of the central sound box, that is, the secondary box 1 is the front left sound box or the central left sound box.

(4) The central sound box 10 determines channel role information of the central sound box 10 and the five secondary boxes according to the first distance information, the second distance information, and the first indication information. For example, audio channel role information of the central sound box 10 and the secondary box 1 to the secondary box 5 is respectively the central audio channel, the front left audio channel, the front right audio channel, a central left channel, a central right channel, and a rear audio channel. A specific solution may be determined and adjusted based on an actual use requirement. This is not limited in this embodiment of this application.

Embodiments described in this specification may be independent solutions, or may be combined based on internal logic to implement different technical effects. All these solutions fall within the protection scope of this application.

It should be further noted that, for the plurality of independent sound boxes whose audio channel roles are not preconfigured, audio channel role information of all sound boxes may be determined according to the method provided in embodiments of this application, so as to implement an objective of forming a stereo sound box system by the plurality of independent sound boxes. Embodiment of this application includes but is not limited to the foregoing scenarios. In actual implementation, for one or more sound boxes whose audio channel roles are preconfigured and one or more sound boxes whose audio channel roles are not preconfigured, audio channel role information of all sound boxes may also be determined according to the method provided in embodiments of this application, so as to implement an objective of forming the stereo sound box system by the plurality of sound boxes. This may improve flexibility of using the sound boxes.

A specific structure of an execution body of a method provided in embodiments of this application is not specifically limited in embodiments of this application, provided that a program that records code for the method provided in embodiments of this application can be run to implement the method provided in the embodiments of this application. For example, the execution body of the method provided in embodiments of this application may be the first sound box, or a functional module that is in the first sound box and that can invoke and execute a program. To implement functions in the method provided in the foregoing embodiments of this application, the first sound box may include a hardware structure and/or a software module, to implement the foregoing functions by using the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Optionally, in some embodiments, an embodiment of this application further provides an electronic device, including a processor. The processor is coupled to a memory, and the processor is configured to execute a computer program or instructions stored in the memory, so that the electronic device performs the operation steps in the foregoing method embodiments.

Optionally, in some embodiments, an embodiment of this application further provides a computer-readable medium. The computer-readable medium stores program code. When the computer program code is run on a computer, the computer is enabled to perform the operation steps in the foregoing method embodiments.

Optionally, in some embodiments, an embodiment of this application further provides a computer program product. The computer program product includes computer program code. When the computer program code is run on a computer, the computer is enabled to perform the operation steps in the foregoing method embodiments.

In embodiments of this application, an electronic device includes a hardware layer, an operating system layer running on the hardware layer, and an application layer running on the operating system layer. The hardware layer may include hardware such as a central processing unit (central processing unit, CPU), a memory management unit (memory management unit, MMU), and a memory (also referred to as a primary memory). An operating system at the operating system layer may be any one or more computer operating systems that implement service processing through a process (process), for example, a Linux operating system, a Unix operating system, an Android operating system, an iOS operating system, or a Windows operating system. The application layer may include applications such as a browser, an address book, word processing software, and instant messaging software.

Aspects or features of this application may be implemented as a method, an apparatus, or a product that uses standard programming and/or engineering technologies. The term "product" used in this specification may cover a computer program that can be accessed from any computer-readable component, carrier or medium. For example, the computer-readable medium may include but is not limited to a magnetic storage component (for example, a hard disk drive, a floppy disk, or a magnetic tape), an optical disc (for example, a compact disc (compact disc, CD), or a digital versatile disc (digital versatile disc, DVD)), a smart card, and a flash memory component (for example, an erasable programmable read-only memory (erasable programmable read-only memory, EPROM), a card, a stick, or a key drive).

Various storage media described in this specification may indicate one or more devices and/or other machine-readable media that are configured to store information. The term "machine-readable media" may include but is not limited to a radio channel and various other media that can store, include, and/or carry instructions and/or data.

It should be understood that the processor in embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor, or the like.

It may be understood that the memory mentioned in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory RAM. For example, the RAM may be used as an external cache. By way of example and not limitation, the RAM may include the following plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

It should be noted that when the processor is a general-purpose processor, a DSP, an ASIC, an FPGA or another programmable logic device, a discrete gate or a transistor logic device, or a discrete hardware component, the memory (storage module) may be integrated into the processor.

It should further be noted that the memory described in this specification aims to include but is not limited to these memories and any memory of another proper type.

A person of ordinary skill in the art may be aware that, in combination with the examples described in embodiments disclosed in this specification, units and methods may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the protection scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in other manners. For example, the foregoing apparatus embodiments are merely examples. For example, division of the units or modules is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The foregoing units described as separate pails may or may not be physically separate, and parts displayed as units may or may not be physical units, may be located in one position, or may be distributed on a plurality of network units. Some or all of the units may be selected based on actual requirements to achieve the objective of the solutions of embodiments.

In addition, function units in embodiments of this application may be integrated into one unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a computer software product. The computer software product is stored in a storage medium, and includes several instructions for instructing a computer device (which may be a personal computer, a server, a network device, or the like) to perform all or some of the steps of the methods described in embodiments of this application. The foregoing storage medium may include but is not limited to any medium that can store program code, such as a USB flash drive, a removable hard disk, a read-only memory (read-only memory, ROM), a random access memory (random access memory, RAM), a magnetic disk, or an optical disc.

Unless otherwise defined, all technical and scientific terms used in this specification have same meanings as those usually understood by a person skilled in the art of this application. The terms used in the specification of this application are merely for the purpose of describing specific embodiments, and are not intended to limit this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

obtaining first distance information between a first sound box and M second sound boxes, wherein the first distance information is a set of first distance relationships between the first sound box and different second sound boxes of the M second sound boxes, wherein obtaining the first distance information between the first sound box and the M second sound boxes comprises:

sending, by the first sound box, at least two detection signals to the M second sound boxes, wherein the at least two detection signals are sent by the first sound box at at least two different moments by using different transmit powers, and the at least two detection signals are in a one-to-one correspondence with the at least two different moments;

receiving, by the first sound box, a response signal sent by each second sound box in the M second sound boxes, wherein each response signal responds to a detection signal of the at least two detection signals sent to the M second sound boxes, and the response signal sent by each second sound box comprises an identifier of the second sound box that sends the corresponding response signal; and determining, by the first sound box, the first distance information based on the at least two detection signals sent to the M second sound boxes and the response signal sent by each second sound box, wherein each first distance relationship of the set of first distance relationships is a categorization of a distance between the first sound box and the corresponding second sound box;

obtaining second distance information between one second sound box in the M second sound boxes and at least two other second sound boxes in the M second sound boxes, wherein the second distance information is a set of second distance relationships between the one second sound box and different second sound boxes of the at least two other second sound boxes; and determining audio channel role information of the first sound box and the M second sound boxes based on the first distance information, the second distance information, and first indication information, wherein the first indication information indicates relative locations of the first sound box and any of the M second sound boxes, and M is an integer greater than 1.

2. The method according to claim 1, wherein determining, by the first sound box, the first distance information based on the at least two detection signals sent to the M second sound boxes and the response signal sent by each second sound box comprises:

determining, by the first sound box, the first distance information based on a first correspondence, the at least two detection signals sent to the M second sound boxes, and the response signal sent by each second sound box, wherein the first correspondence indicates that different transmit powers of the first sound box correspond to the response signals sent by the M second sound boxes at different distances from the first sound box.

3. The method according to claim 1, wherein obtaining the second distance information between the one second sound box and the at least two other second sound boxes in the M second sound boxes comprises:

sending, by the first sound box, a first message to the one second sound box, wherein the first message indicates to the one second sound box to obtain the second distance information; and receiving, by the first sound box, the second distance information sent by the one second sound box.

4. The method according to claim 1, further comprising:

sending, by the first sound box, a second message to any second sound box in the M second sound boxes, wherein the second message indicates to the any second sound box to output prompt information, and the prompt information prompts a user to confirm the relative locations of the first sound box and the any second sound box in the M second sound boxes; and receiving, by the first sound box, the first indication information sent by the any second sound box, wherein the first indication information is generated based on a user input responding to the prompt information.

5. The method according to claim 1, wherein determining the audio channel role information of the first sound box and the M second sound boxes based on the first distance information, the second distance information, and the first indication information comprises:

determining, by the first sound box, a first topological relationship between the first sound box and the M second sound boxes based on the first distance information and the second distance information, and determining the audio channel role information of the first sound box and the M second sound boxes based on the first topological relationship and the first indication information.

6. The method according to claim 1, wherein after determining the audio channel role information of the first sound box and the M second sound boxes, the method further comprises:

receiving, by the first sound box, a first audio signal sent by an audio source device, wherein the first audio signal comprises an audio signal corresponding to audio channel role information of each second sound box in the M second sound boxes; and sending, by the first sound box to each second sound box, an audio signal that is in the first audio signal and that corresponds to the audio channel role information of the corresponding second sound box.

7. The method according to claim 1, wherein after determining the audio channel role information of the first sound box and the M second sound boxes, the method further comprises:

sending, by the first sound box to each second sound box in the M second sound boxes, audio channel role information corresponding to the respective second sound box.

8. A system, comprising:

a first sound box; and

M second sound boxes;

wherein the first sound box is configured to send at least two detection signals to the M second sound boxes, wherein the at least two detection signals are sent by the first sound box at at least two different moments by using different transmit powers, and the at least two detection signals are in a one-to-one correspondence with the at least two different moments;

wherein each second sound box of the M second sound boxes is configured to send a response signal to the first sound box when receiving a detection signal of the at least two detection signals, wherein each response signal responds to the received detection signal, and the response signal sent by each second sound box comprises an identifier of the second sound box that sends the corresponding response signal; and wherein the first sound box is further configured to:

receive the response signal sent by each second sound box of the M second sound boxes, and determine first distance information between the first sound box and each second sound box of the M second sound boxes based on the at least two detection signals sent to the M second sound boxes and the response signal sent by each second sound box, wherein the first distance information is a set of first distance relationships between the first sound box and different second sound boxes of the M second sound boxes, and wherein each first distance relationship of the set of first distance relationships is a categorization of a distance between the first sound box and the corresponding second sound box; and obtain second distance information between one second sound box in the M second sound boxes and at least two other second sound boxes in the M second sound boxes, wherein the second distance information is a set of second distance relationships between the one second sound box and different second sound boxes of the at least two other second sound boxes; and determine audio channel role information of the first sound box and the M second sound boxes based on the first distance information, the second distance information, and first indication information, wherein the first indication information indicates relative locations of the first sound box and any of the M second sound boxes, and M is an integer greater than 1.

9. An electronic device configured to act as a first sound box, the electronic device comprising:

one or more processors;

a memory comprising one or more computer programs;

wherein when the one or more computer programs are executed by the one or more processors, the first sound box is enabled to perform:

obtaining first distance information between the first sound box and M second sound boxes, wherein obtaining the first distance information between the first sound box and the M second sound boxes comprises:

sending at least two detection signals to the M second sound boxes, wherein the at least two detection signals are sent by the first sound box at at least two different moments by using different transmit powers, and the at least two detection signals are in a one-to-one correspondence with the at least two different moments;

receiving a response signal sent by each second sound box in the M second sound boxes, wherein each response signal responds to a detection signal of the at least two detection signals sent to the M second sound boxes, and the response signal sent by each second sound box comprises an identifier of the second sound box that sends the corresponding response signal; and determining the first distance information based on the at least two detection signals sent to the M second sound boxes and the response signal sent by each second sound box, wherein each first distance relationship of a set of first distance relationships is a categorization of a distance between the first sound box and the corresponding second sound box;

obtaining second distance information between one second sound box in the M second sound boxes and at least two other second sound boxes in the M second sound boxes, wherein the second distance information is a set of second distance relationships between the second sound box and different second sound boxes of the at least two other second sound boxes; and determining audio channel role information of the first sound box and the M second sound boxes based on the first distance information, the second distance information, and first indication information, wherein the first indication information indicates relative locations of the first sound box and any of the M second sound boxes, and M is an integer greater than 1.

10. The electronic device according to claim 9, wherein determining the first distance information based on the at least two detection signals sent to the M second sound boxes and the response signal sent by each second sound box comprises:

determining the first distance information based on a first correspondence, the at least two detection signals sent to the M second sound boxes, and the response signal sent by each second sound box, wherein the first correspondence indicates that different transmit powers of the first sound box correspond to the response signals sent by the M second sound boxes at different distances from the first sound box.

11. The electronic device according to claim 9, wherein obtaining the second distance information between the one second sound box and the at least two other second sound boxes in the M second sound boxes comprises:

sending a first message to the one second sound box, wherein the first message indicates to the one second sound box to obtain the second distance information; and receiving the second distance information sent by the one second sound box.

12. The electronic device according to claim 9, wherein when the one or more computer programs are executed by the one or more processors, the first sound box is further enabled to perform:

sending a second message to any second sound box in the M second sound boxes, wherein the second message indicates to the any second sound box to output prompt information, and the prompt information prompts a user to confirm the relative locations of the first sound box and the any second sound box in the M second sound boxes; and receiving the first indication information sent by the any second sound box, wherein the first indication information is generated based on a user input responding to the prompt information.

13. The electronic device according to claim 9, wherein determining the audio channel role information of the first sound box and the M second sound boxes based on the first distance information, the second distance information, and the first indication information comprises:

determining a first topological relationship between the first sound box and the M second sound boxes based on the first distance information and the second distance information, and determining the audio channel role information of the first sound box and the M second sound boxes based on the first topological relationship and the first indication information.

14. The electronic device according to claim 9, wherein determining the audio channel role information of the first sound box and the M second sound boxes based on the first distance information, the second distance information, and the first indication information comprises:

determining a second topological relationship between the first sound box and the M second sound boxes based on the first distance information and the first indication information, and determining the audio channel role information of the first sound box and the M second sound boxes based on the second topological relationship and the second distance information.

15. The electronic device according to claim 9, wherein when the one or more computer programs are executed by the one or more processors, the first sound box is further enabled to perform:

after determining the audio channel role information of the first sound box and the M second sound boxes, receiving a first audio signal sent by an audio source device, wherein the first audio signal comprises an audio signal corresponding to audio channel role information of each second sound box in the M second sound boxes; and sending, to each second sound box, an audio signal that is in the first audio signal and that corresponds to the audio channel role information of the respective second sound box.

16. The electronic device according to claim 9, wherein when the one or more computer programs are executed by the one or more processors, the first sound box is further enabled to perform:

after determining the audio channel role information of the first sound box and the M second sound boxes, sending, to each of the M second sound boxes, audio channel role information corresponding to each second sound box.

17. The method according to claim 1, wherein determining the audio channel role information of the first sound box and the M second sound boxes based on the first distance information, the second distance information, and the first indication information comprises:

determining, by the first sound box, a second topological relationship between the first sound box and the M second sound boxes based on the first distance information and the first indication information, and determining the audio channel role information of the first sound box and the M second sound boxes based on the second topological relationship and the second distance information.

18. The system according to claim 8, wherein the first sound box being configured to determine the first distance information based on the at least two detection signals sent to the M second sound boxes and the response signal sent by each second sound box comprises the first sound box being configured to:

determine the first distance information based on a first correspondence, the at least two detection signals sent to the M second sound boxes, and the response signal sent by each second sound box, wherein the first correspondence indicates that different transmit powers of the first sound box correspond to the response signals sent by the M second sound boxes at different distances from the first sound box.

19. The system according to claim 8, wherein the first sound box being configured to obtain the second distance information between the one second sound box and the at least two other second sound boxes in the M second sound boxes comprises the first sound box being configured to:

send a first message to the one second sound box, wherein the first message indicates to the one second sound box to obtain the second distance information; and receive the second distance information sent by the one second sound box.

* * * * *